United States Patent
Akatsu et al.

(10) Patent No.: US 9,287,745 B2
(45) Date of Patent: Mar. 15, 2016

(54) STATOR TEETH, STATOR, ROTATING ELECTRIC MACHINE, AND METHOD FOR CONTROLLING ROTATING ELECTRIC MACHINE

(75) Inventors: Kan Akatsu, Tokyo (JP); Hiroki Hijikata, Tokyo (JP)

(73) Assignee: SHIBAURA INSTITUTE OF TECHNOLOGY, Tokyo (JP)

( * ) Notice: Subject to any disclaimer, the term of this patent is extended or adjusted under 35 U.S.C. 154(b) by 139 days.

(21) Appl. No.: 13/982,407

(22) PCT Filed: Jan. 27, 2012

(86) PCT No.: PCT/JP2012/051895
§ 371 (c)(1),
(2), (4) Date: Jul. 29, 2013

(87) PCT Pub. No.: WO2012/102400
PCT Pub. Date: Aug. 2, 2012

(65) Prior Publication Data
US 2013/0307455 A1 Nov. 21, 2013

(30) Foreign Application Priority Data
Jan. 27, 2011 (JP) ................................ 2011-015774

(51) Int. Cl.
*H02P 1/00* (2006.01)
*H02P 3/00* (2006.01)
(Continued)

(52) U.S. Cl.
CPC .. *H02K 3/28* (2013.01); *H02K 3/20* (2013.01); *H02K 21/16* (2013.01); *H02P 4/00* (2013.01); *H02P 25/18* (2013.01); *H02P 29/00* (2013.01)

(58) Field of Classification Search
CPC ........... H02P 25/18; H02P 1/32; H02P 25/04; H02P 25/20; H02P 1/26; H02P 1/04; H02P 1/44; H02P 1/46; H02P 25/188; H02P 25/24; H02P 27/08; H02P 3/12; H02P 5/74
USPC ............... 318/400.09, 400.29, 441, 494, 497, 318/773, 776, 777; 310/68 R, 68 B, 180, 184
See application file for complete search history.

(56) References Cited

U.S. PATENT DOCUMENTS 3,866,104 A * 2/1975 Heine ............................ 318/696
4,035,701 A * 7/1977 Jensen .......................... 318/771
(Continued)

FOREIGN PATENT DOCUMENTS

CN 1765047 A 4/2006
CN 201414030 2/2010
(Continued)

OTHER PUBLICATIONS

International Search Report mailed Apr. 24, 2012 for the corresponding PCT Application No. PCT/JP2012/051895.

*Primary Examiner* — Paul Ip
(74) *Attorney, Agent, or Firm* — Leason Ellis LLP.

(57) ABSTRACT

There is provided a single motor which performs plural driving characteristics and can expand output range thereof. Three coils are wounded around each of the stator teeth A to F, and provided to each stator tooth A to F are switches for providing a concentrated winding state by connecting the three coils in series in each stator tooth A to F, and switches for providing a distributed winding state by connecting in series the coils of any one of units through the stator teeth A to F Depending on the rotating speed, the torque or the like, the coils are changed between the concentrated winding state and the distributed winding state.

18 Claims, 21 Drawing Sheets

(51) Int. Cl.
*H02P 5/00* (2006.01)
*H02K 3/28* (2006.01)
*H02K 3/20* (2006.01)
*H02K 21/16* (2006.01)
*H02P 25/18* (2006.01)
*H02P 4/00* (2006.01)
*H02P 29/00* (2006.01)

(56) References Cited

U.S. PATENT DOCUMENTS

| | | | | |
|---|---|---|---|---|
| 4,144,470 | A * | 3/1979 | Auinger | 310/198 |
| 4,477,760 | A * | 10/1984 | Kuznetsov | 318/773 |
| 4,675,591 | A * | 6/1987 | Pleiss | 318/773 |
| 4,746,844 | A * | 5/1988 | MacKelvie et al. | 318/400.35 |
| 4,772,842 | A * | 9/1988 | Ghosh | 318/778 |
| 5,051,639 | A * | 9/1991 | Satake et al. | 310/112 |
| 5,068,559 | A * | 11/1991 | Satake et al. | 310/112 |
| 5,254,894 | A * | 10/1993 | Satake et al. | 310/114 |
| 5,352,964 | A * | 10/1994 | Nakamura et al. | 318/772 |
| 5,442,250 | A * | 8/1995 | Stridsberg | 310/186 |
| 5,483,111 | A * | 1/1996 | Kuznetsov | 310/12.21 |
| 5,614,799 | A * | 3/1997 | Anderson et al. | 318/400.09 |
| 5,652,493 | A * | 7/1997 | Hendershot, Jr. | 318/701 |
| 5,675,222 | A * | 10/1997 | Fliege | 318/139 |
| 5,719,453 | A * | 2/1998 | Horst | 310/68 R |
| 5,760,567 | A * | 6/1998 | Nakamura et al. | 318/777 |
| 5,912,522 | A * | 6/1999 | Rivera | 310/184 |
| 5,917,295 | A * | 6/1999 | Mongeau | 318/400.29 |
| 6,097,127 | A * | 8/2000 | Rivera | 310/184 |
| 6,175,209 | B1 * | 1/2001 | Fei | 318/776 |
| 6,281,609 | B1 * | 8/2001 | Itami et al. | 310/68 B |
| 6,965,182 | B2 * | 11/2005 | Jeong et al. | 310/180 |
| 7,227,288 | B2 * | 6/2007 | Goche | 310/184 |
| 7,348,764 | B2 * | 3/2008 | Stewart et al. | 322/24 |
| 7,550,953 | B2 * | 6/2009 | Shah | 322/46 |
| 8,143,834 | B2 * | 3/2012 | Hsu | 318/497 |
| 8,288,979 | B2 * | 10/2012 | Bates et al. | 318/432 |
| 8,415,910 | B2 * | 4/2013 | Fulton | 318/497 |
| 8,446,119 | B2 * | 5/2013 | Bates et al. | 318/494 |
| 8,688,346 | B2 * | 4/2014 | Boughtwood | 701/71 |
| 8,803,384 | B2 * | 8/2014 | Hull et al. | 310/68 R |
| 8,829,755 | B2 * | 9/2014 | Hwang et al. | 310/184 |
| 8,901,797 | B2 * | 12/2014 | Castle et al. | 310/186 |
| 9,059,658 | B2 | 6/2015 | Bates et al. | |
| 2002/0105301 | A1 * | 8/2002 | Bush et al. | 318/771 |
| 2002/0163262 | A1 * | 11/2002 | Hsu | 310/68 R |
| 2005/0200224 | A1 | 9/2005 | Goche | 310/184 |
| 2008/0001580 | A1 * | 1/2008 | Shah | 322/46 |
| 2008/0012538 | A1 * | 1/2008 | Stewart et al. | 322/89 |
| 2008/0150471 | A1 * | 6/2008 | Unsworth et al. | 318/771 |
| 2010/0052584 | A1 * | 3/2010 | Bates et al. | 318/400.11 |
| 2010/0181949 | A1 * | 7/2010 | Bates et al. | 318/400.09 |
| 2011/0205662 | A1 * | 8/2011 | Bates et al. | 360/73.08 |
| 2011/0234139 | A1 * | 9/2011 | Hsu | 318/497 |
| 2012/0056564 | A1 * | 3/2012 | Dietl | 318/17 |
| 2012/0068656 | A1 * | 3/2012 | Fulton | 318/497 |
| 2012/0068657 | A1 * | 3/2012 | Fulton et al. | 318/519 |
| 2012/0286593 | A1 * | 11/2012 | Yokogawa et al. | 310/43 |
| 2012/0293024 | A1 * | 11/2012 | Yokogawa et al. | 310/43 |
| 2013/0015742 | A1 * | 1/2013 | Inoue et al. | 310/208 |
| 2013/0069496 | A1 * | 3/2013 | Hwang et al. | 310/68 R |
| 2013/0175966 | A1 * | 7/2013 | Astigarraga et al. | 318/497 |
| 2013/0229136 | A1 * | 9/2013 | Bates et al. | 318/400.41 |

FOREIGN PATENT DOCUMENTS

| | | |
|---|---|---|
| EP | 0547243 A | 6/1993 |
| JP | 06-205573 A | 7/1994 |
| JP | 3596711 B2 | 9/2004 |
| JP | 2005-006400 A | 1/2005 |
| JP | 3695344 B2 | 7/2005 |
| JP | 2005-354807 A | 12/2005 |
| JP | 3968673 B2 | 6/2007 |
| JP | 2009-278841 A | 11/2009 |
| WO | WO-2004/088832 A | 10/2004 |

\* cited by examiner

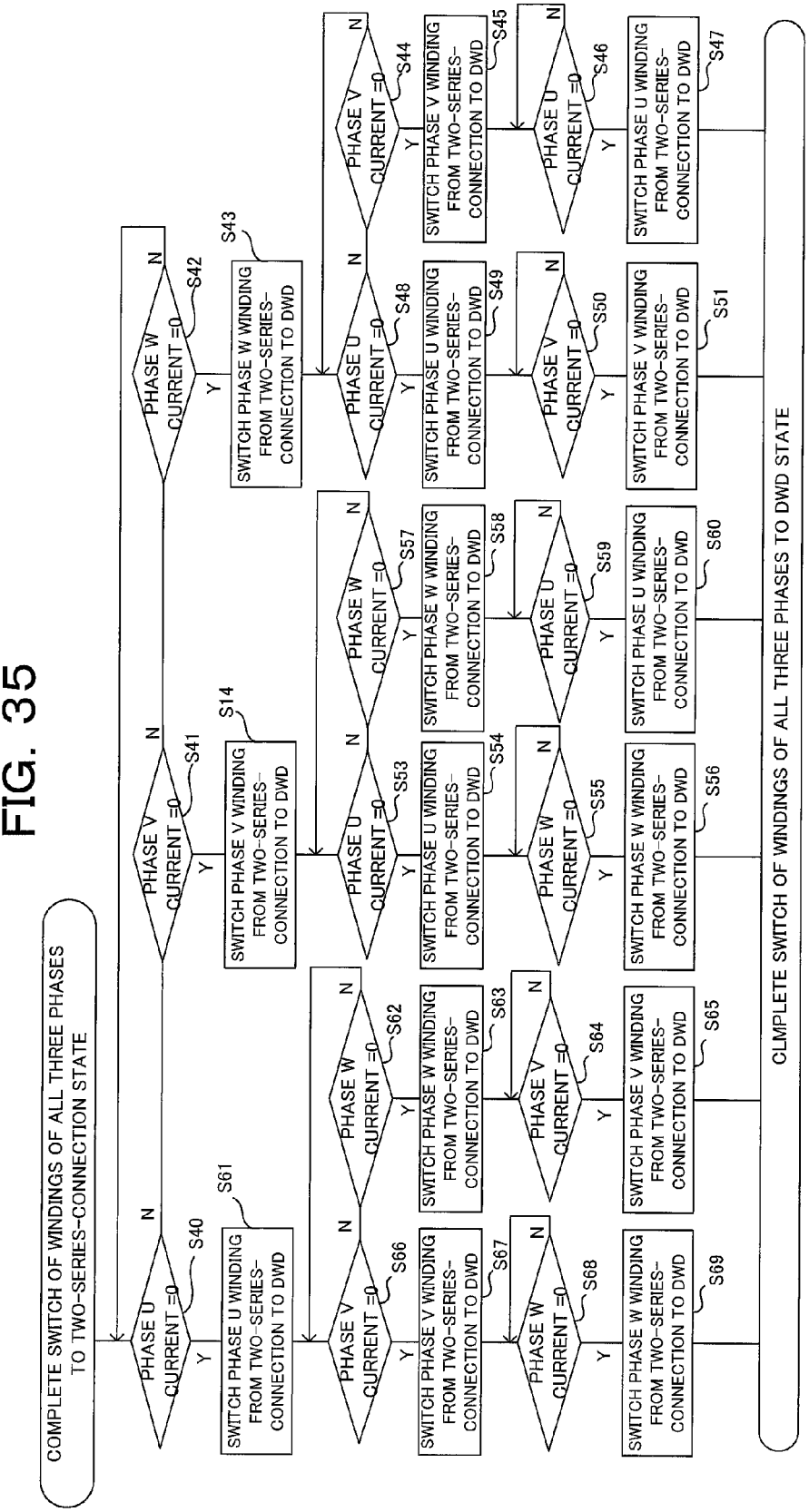

STATOR TEETH, STATOR, ROTATING ELECTRIC MACHINE, AND METHOD FOR CONTROLLING ROTATING ELECTRIC MACHINE

CROSS-REFERENCE TO RELATED PATENT APPLICATIONS

This application is a U.S. National Phase Application under 35 U.S.C. §371 of International Patent Application No. PCT/JP2012/051895, filed Jan. 27, 2012, and claims the benefit of Japanese Patent Application No. 2011-015774, filed Jan. 27, 2011, all of which are incorporated by reference herein in their entities. The International Application was published in Japanese on Aug. 2, 2012 as International Publication No. WO/2012/102400 under PCT Article 21(2).

FIELD OF THE INVENTION

The present invention relates to stator teeth, a stator, a rotating electric machine having the stator, and method for controlling the rotating electric machine.

BACKGROUND OF THE INVENTION

A permanent magnet synchronous motor, as using permanent magnets as a rotor thereof, can provide high output and high efficiency in comparison with an induction machine and other motors. As a stator, punched out silicon steel sheets are used in a laminated manner, and coils are wound around the silicon steel sheets. Magnetic flux, generated from the permanent magnets of the rotor, provides interlinkage with the coils, and thereby, induced voltage is generated at the coils. By applying voltage higher than the induced voltage from an inverter connected with the coils, and applying electric current synchronized with the rotation through the coils, the rotor generates torque.

At this moment, the induced voltage increases according to rotating speed. Because of this, when the induced voltage becomes higher than the voltage of the inverter, it is impossible to apply the electric current through the coils. Then, as the motor cannot generate torque, the upper limit of the rotating speed reaches a ceiling. In order to increase the upper limit of the rotating speed, known is the following prior art for weakening the magnetic flux of the magnets or reducing the magnetic flux providing interlinkage with the coils.

There is a control method called as the field-weakening control where magnetic flux, opposed to the magnetic flux generated from the magnets, is made to generate from the coils so that the magnetic flux from the magnets does not provide interlinkage with the coils. When using the field-weakening control, the magnetic flux of the magnets looks weakened. Then, the induced voltage decreases, and the rotating speed increases.

There is a structure called as the field-alternative structure where two kinds of magnets which have different force of holding magnetic flux of a magnet (the coercive force) from each other are arranged to the rotor, and by electric current from outside the direction of magnetic flux of magnets having weaker coercive force is made counter to the direction of magnetic flux of magnets having stronger coercive force. By this structure, the polar character of the magnets having weaker coercive force is inverted, and the magnetic flux output from the magnets having stronger coercive force enters into the magnets having weaker coercive force. Thereby, the magnetic flux which provides interlinkage with the coils is reduced.

The patent literatures 1 and 2 disclose that the coils wound around the stator are divided into two groups, and when the rotating speed is low, the two groups are connected in series and are used, and when the rotating speed is high, the two groups of coils are disconnected from each other so that only one of the two groups is used. Thereby, it is possible to fall the magnetic flux providing interlinkage with the coils to the one-half.

In the patent literature 3, it is disclosed that an art that the coils wound around the stator are divided into two groups, and when the rotating speed is high and the torque is low, winding units are connected in parallel, and when the rotating speed is low and the torque is high, the winding units are connected in series, so that the magnetic flux providing interlinkage with the coils is fallen to one-half.

In the patent literature 4, it is disclosed that by making the magnets arranged to the rotor rotatable, when the rotating speed is low, the magnets are arranged in the direction opposed to the coils, and when the rotating speed is high, the magnets are arranged in the direction parallel to the coils. The magnets which are arranged in the direction parallel to the coils the area of the magnets is small as viewed from the coils. Because of this, it is possible to reduce the magnetic flux providing interlinkage with the coils.

CITATION LIST

Patent Literature

PTL1: JP-B-3596711
PTL2: JP-B-3968673
PTL3: JP-A-2005-354807
PTL4: JP-B-3695344

PROBLEMS TO BE SOLVED BY THE INVENTION

However, in a case of the field-weakening control, there is a problem such that efficiency is lowered because copper loss occurs by increasing line current value in order to apply filed-weakening current. And also, there is a problem such that as the magnetic field which eliminates the magnetic flux of magnets is a demagnetizing field to the magnets, operating points of the magnets are lowered and thermal demagnetization is likely to occur.

In a case of the field-alternative structure, there is a problem such that efficiency is lowered because it is necessary to apply electric current continuously in order to hold the polar character of the magnets having weaker coercive force. And also, there is a problem such that as space where to arrange the magnets having weaker coercive power is required on the rotator, the output decreases in comparison with a motor with magnets all of which have strong coercive power. Further, there is a problem such that the amount of the inverter becomes large and it is necessary to increase dielectric strength of the coils, because it is necessary to apply high current instantaneously in order to invert the polar character of the magnets having weaker coercive power.

The arts disclosed in the patent literatures 1, 2 and 3 have a problem such that as it is impossible to increase electric current when half of the coils are used, the torque halves in comparison with a case that two connected coils are used.

The art disclosed in the patent literature 4 has a problem such that an external system to rotate the magnets is required, which can lead to upsizing of apparatus.

The present invention has been made based on the above mentioned matters. The problem to be solved of the present invention is performing plural drive characteristics by one motor without upsizing an apparatus so as to expand the output range thereof in the technical field of permanent magnet synchronous motor.

SUMMARY OF THE INVENTION

Means for Solving the Problem

For solving the above problem, stator teeth of the present invention is stator teeth placed to a stator yoke, and each stator tooth of the stator teeth comprises: at least two winding units being wound around the stator tooth; and at least one switch being connected with an end portion of one of the winding units and with an end portion of the other one of the winding units, wherein the switch is capable of connecting with an end portion of another winding unit wound around another stator tooth. (A first aspect)

Further, a stator of the present invention is a stator comprising: a stator yoke; and stator teeth formed unifiedly with the stator yoke, or placed to the stator yoke, wherein at least two winding units is wound around each stator tooth of the stator teeth, and at least one switch is connected with an end portion of one of the winding units and an end portion of the other one of the winding units, wherein the switch is capable of also connecting with an end portion of another winding unit wound around another stator tooth. (A second aspect)

A rotating electric machine of the present invention is a rotating electric machine comprising: a rotor having a permanent magnet; stator teeth formed unifiedly with a stator yoke, or placed to the stator yoke, at least three of the stator teeth being provided for one pole of the permanent magnet; at least two winding units wound around each stator tooth of the stator teeth; and at least one switch being provided to each stator tooth to be connected with an end portion of one of the winding units and an end portion of the other one of the winding units, wherein the switch is further connected with an end portion of another winding unit wound around another stator tooth. (A third aspect)

Further, a method for controlling a rotating electric machine of the present invention is a method for controlling a rotating electric machine comprising: a rotor having permanent magnet; stator teeth formed unifiedly with a stator yoke, or placed to the stator yoke, at least three of the stator teeth being provided for one pole of the permanent magnet; at least two winding units wound around each stator tooth of the stator teeth; and at least one switch being provided to each stator tooth to be connected with an end portion of one of the winding units and an end portion of the other one of the winding units, the switch being further connected with an end portion of another winding unit wound around another stator tooth, the method including the steps: changing, when a rotating speed necessary for the rotating electric machine is higher than a predetermined criterion speed, the switch so that the end portion of the one of the two winding units and the end portion of the other one of the two winding units are connected with each other, and changing, when the rotating speed necessary for the rotating electric machine is lower than a predetermined criterion speed, the switch so that the end portion of the one of the two winding units and the end portion of the another winding unit wound around the another stator tooth are connected with each other. (A fourth aspect)

According to the stator teeth of the first aspect, the stator of the second aspect, the rotating electric machine of the third aspect, and the method for controlling the rotating electric machine of the fourth aspect, by switching the switches, the connection state of winding units wound around the stator teeth is changed between the concentrated winding state and the distributed winding state depending on the rotating speed. Thereby, without making a device larger, it is possible to perform plural driving characteristics and expand output range with just a single motor.

In the method for controlling the rotating electric machine of the fourth aspect, the connection sate may be changed between the concentrated winding state and the distributed winding state depending on the torque, instead of the rotating speed. (A fifth aspect) Also, in this case, without making a device larger, it is possible to perform plural driving characteristics and expand output range with just a single motor.

As a sixth aspect of the present invention, voltage to be applied to the winding units may be changed from direct voltage to alternating voltage, in such a way that, in a case that a connection between winding units to which plus voltage is applied is switched intermittently at a predetermined proportion for each phase, a connection between winding units to which minus voltage is applied is always held, and in a case that the connection between winding units to which minus voltage is applied to is switched intermittently at a predetermined proportion for each phase, the connection between winding units to which plus voltage is applied to is always held. (A sixth aspect).

According to the sixth aspect, it is not necessary to connect an inverter outside. Thereby, it is possible to realize downsizing of the system.

As a seventh aspect, switching, the induced voltage may be made into a sine wave by switching the switch so as to switch between a concentrated winding state that the end portion of the one of the two winding units and the end portion of the other one of the two winding units and a distributed winding state that the end portion of one of the two winding units and the end portion of the another winding unit wound around the another stator tooth, a connection state of winding units of each phase minutely according to a voltage aim value. (A seventh aspect)

According to the seventh aspect, it is possible to reduce the torque ripple so as to reduce the iron loss, As an eighth aspect, a method for controlling the rotating electric machine in which the switch is further connected with an end portion of another winding unit wound around another stator tooth, may be configured in such a way that when the switch is changed so that the end portion of one of the two winding units and the end portion of the another winding unit wound around the another stator tooth, the switch is changed so that, with respect to each stator tooth, the winding unit is connected with a winding unit different positionally, and so that the number of winding units included in each phase is equal to each other. (An eighth aspect)

According to the controlling method of the eighth aspect, it is possible to dissolve unbalance between phases by equalizing the number of coils of rotor side and the number of coils of yoke side to each other.

As a ninth aspect of the present invention, in the third aspect, at least six stator teeth are provided to one pole of the permanent magnetic, at least three winding units are wound around each stator tooth, the switch includes a switch for connecting the at least three winding units in series or disconnecting the at least three winding units from each other, and a switch for connecting or disconnecting from each other, one winding unit wound around one stator tooth and one winding unit wound around the other stator tooth, wherein a winding unit located at an end portion on an opposite side of a winding unit located at an end portion connecting with a current supplying terminal, within the winding units wound around each stator tooth, is connected with a winding unit located at an end portion on an opposite side of a winding unit located at an end portion connecting with a current supplying terminal in a paired stator tooth, and the switch further includes a switch connecting with each other or disconnecting from each other, a winding unit of the end portion for connecting with the current supplying terminal of the stator tooth, and a winding unit of the end portion for connecting with the current supplying terminal of a paired stator tooth. (A ninth aspect)

As a tenth aspect of the present invention, a method for controlling a rotating electric machine of the present invention is a method for controlling a rotating electric machine to which three-phrase alternating current is applied, the rotating electric machine comprising: a rotor having a permanent magnet; stator teeth formed unifiedly with a stator yoke, or placed to the stator yoke, at least six of the stator teeth being provided for one pole of the permanent magnet; at least three winding units wound around each stator tooth of the stator teeth; a first switch for connecting the at least three winding units in series or disconnecting the at least three winding units from each other; and a second switch for connecting or disconnecting from each other, one winding unit wound around one stator tooth and one winding unit wound around the other stator tooth; wherein a winding unit located at an end portion on opposite side of a winding unit located at an end portion connecting with a current supplying terminal, within the winding units wound around each stator tooth, is connected with a winding unit located at an end portion on opposite side of a winding unit located at an end portion connecting with a current supplying terminal in a paired stator tooth, and a third switch is comprised, the third switch connecting with each other or disconnecting from each other, a winding unit located at an end portion connecting with the current supplying terminal of each stator tooth and a winding unit located at an end portion connecting with the current supplying terminal of a paired stator tooth, the method having: a first connection state that when a rotating speed necessary for the rotating electric machine is higher than a predetermined criterion speed, the first switch is switched so as to connect in series the at least three winding units wound with each other; and a second connection state that when a rotating speed necessary for the rotating electric machine is lower than a predetermined criterion speed, the first switch is disconnected and the second switch is switched so as to connect a winding unit of one stator tooth and the other stator tooth with each other, and including the steps to be executed in order to change over from the first connection state to the second connection state: at a moment when it is detected an alternating current value of any one of phases has become zero, connecting with each other by the third switch, a winding unit located at the end portion connecting with the current supplying terminal of a stator tooth to which the alternating current of the phase is applied and a winding unit located at the end portion connecting with the current supplying terminal of the paired stator tooth; and disconnecting from each other by the first switch, the at least three winding units wound around the stator tooth to which the alternating current of the phase is applied; and at a moment when it is detected an alternating current value of any one of phases has become zero secondly: connecting with each other by the second switch, one winding unit wound around one stator tooth of the phase and one winding unit wound around the other stator tooth of the phase; and with respect to the other stator teeth, further connecting with each other by the second switch, one winding unit wound around each stator tooth and one winding unit wound around the other stator tooth; and disconnecting from each other by the third switch, the winding unit located at the end portion connecting with the current supplying terminal of the stator tooth to which the alternating current of the phase is supplied and the winding unit located at the end portion connecting with the current supplying terminal of the paired stator tooth, and the method including in order to change over from the second connection state to the first connection state, the steps of connecting with each other and disconnecting from each other the winding units, the steps being executed in accordance with processes opposite to the mentioned processes at a moment when it is detected that the alternating current value of any one of phase has become zero. (A tenth aspect)

As an eleventh aspect of the present invention, a method for controlling a rotating electric machine of the present invention is a method for controlling a rotating electric machine to which three-phrase alternating current is applied, the rotating electric machine comprising: a rotor having a permanent magnet; stator teeth formed unifiedly with a stator yoke, or placed to the stator yoke, at least six of the stator teeth being provided for one pole of the permanent magnet; at least three winding units wound around each stator tooth of the stator teeth; a first switch for connecting the at least three winding units in series or disconnecting the at least three winding units from each other; and a second switch for connecting or disconnecting from each other, one winding unit wound around one stator tooth and one winding unit wound around the other stator tooth; wherein a winding unit located at an end portion on opposite side of a winding unit located at an end portion connecting with a current supplying terminal, within the winding units wound around each stator tooth, is connected with a winding unit located at an end portion on opposite side of a winding unit located at an end portion connecting with a current supplying terminal in a paired stator tooth, and a third switch is comprised, the third switch connecting with each other or disconnecting from each other, a winding unit located at an end portion connecting with the current supplying terminal of each stator tooth and a winding unit located at an end portion connecting with the current supplying terminal of a paired stator tooth, the method having: a first connection state that when a rotating speed necessary for the rotating electric machine is lower than a predetermined criterion torque, the first switch is switched so as to connect in series the at least three winding units wound with each other; and a second connection state that when a rotating speed necessary for the rotating electric machine is higher than a predetermined criterion torque, the first switch is disconnected and the second switch is switched so as to connect a winding unit of one stator tooth and the other stator tooth with each other, and including the steps to be executed in order to change over from the first connection state to the second connection state: at a moment when it is detected an alternating current value of any one of phases has become zero, connecting with each other by the third switch, a winding unit located at the end portion connecting with the current supplying terminal of a stator tooth to which the alternating current of the phase is applied and a winding unit located at the end portion connecting with the current supplying terminal of the paired stator tooth; and disconnecting from each other by the first switch, the at least three winding units wound around the stator tooth to which the alternating current of the phase is applied; and at a moment when it is detected an alternating current value of any one of phases has become zero secondly: connecting with each other by the second switch, one winding unit wound around one stator tooth of the phase and one winding unit wound around the other stator tooth of the phase; and with respect to the other stator teeth, further connecting with each other by the second switch, one winding unit wound around each stator tooth and one winding unit wound around the other stator tooth; and disconnecting from each other by the third switch, the winding unit located at the end portion connecting with the current supplying terminal of the stator tooth to which the alternating current of the phase is supplied and the winding unit located at the end portion connecting with the current supplying terminal of the paired stator tooth, and the method including in order to change over from the second connection state to the first connection state, the steps of connecting with each other and disconnecting from each other the winding units, the steps being executed in accordance with processes opposite to the mentioned processes at a moment when it is detected that the alternating current value of any one of phase has become zero. (An eleventh aspect)

According to the rotating electric machine of the ninth aspect and the methods for controlling the rotating electric machine of the tenth and eleventh aspects, by changing the winding units of each phase from the concentrated winding state to the two-series-connection of common winding units at the moment when the current of each phase has become zero, in a period from a period when the current of each phase becomes zero and a period when the current of each phase becomes zero secondly, the current flows in the common winding units three times more than before. Thereby, flowing current is not different between before and after connecting the common winding units. Accordingly, the torque ripple does not occur. Further, by changing the connection state from the two-series connection to the distributed winding state at the moment when the current of each phase is zero, voltage spike does not occur. Accordingly, a voltage spike does not occur at the moment of switching, and it is possible to perform the switching without loss.

As a twelfth aspect of the present invention, in the method for controlling the rotating electric machine of the tenth and eleventh aspects, the switch is switched between the first connection state and the second connection state minutely according to a voltage aim value, so that the induced voltage is formed as a sine carve. (A twelfth aspect)

According to the twelfth aspect, at a moment when the current of each phase has become zero, the connection state is switched between the first connection state and the second connection state. Accordingly, the torque triple does not occur. Further, as the voltage spike does not occur at a moment of switching, it is possible to switch the connection state of winding units without loss.

As a thirteenth aspect of the present invention, in the stator teeth of the first aspect, the switch is a bi-directional switch connecting with each other source terminals of MOSFETs (Metal-Oxide Semiconductor Field-Effect Transistors), or drain terminals of MOSFETSs. (A thirteenth aspect)

As a fourteenth aspect of the present invention, in the stator of the second aspect, the switch is a bi-directional switch connecting with each other source terminals of MOSFETs (Metal-Oxide Semiconductor Field-Effect Transistors), or drain terminals of MOSFETSs. (A fourteenth aspect)

As a fifteenth aspect of the present invention, in the rotating electric machine of the third aspect or the fifth aspect, the switch is a bi-directional switch connecting with each other source terminals of MOSFETs (Metal-Oxide Semiconductor Field-Effect Transistors), or drain terminals of MOSFETSs. (A fifteenth aspect)

As a sixteenth aspect of the present invention, in the method for controlling the rotating electric machine of the fourth aspect, the sixth aspect or the seventh aspect, the switch is a bi-directional switch connecting with each other source terminals of MOSFETs (Metal-Oxide Semiconductor Field-Effect Transistors), or drain terminals of MOSFETSs. (A sixteenth aspect)

According to the stator teeth of the thirteenth aspect, the stator of the fourteenth aspect, the rotating electric machine of the fifteenth aspect and the method for controlling the rotating electric machine of the sixteenth aspect, the bi-directional switch is employed. Thereby, it is possible to disconnect reliably the connection between winding units which should be disconnected.

BRIEF DESCRIPTION OF THE DRAWING

FIG. 35 is a flow chart showing processes until the winding of each phase is changed to the distributed winding drive from the two-series of common winding.

DETAILED DESCRIPTION OF THE INVENTION

Hereinafter preferable Embodiments of this invention will be explained in detail referring to figures attached. However, the size and scale of each portion differ from actual ones. As the following embodiments are appropriate concrete examples of the present invention, various technically-preferable limitations are provided to the embodiments. However, the range of the present invention is not limited to the embodiments, unless otherwise described that the present invention is limited in the following descriptions.

[The First Embodiment]

Figure 1:
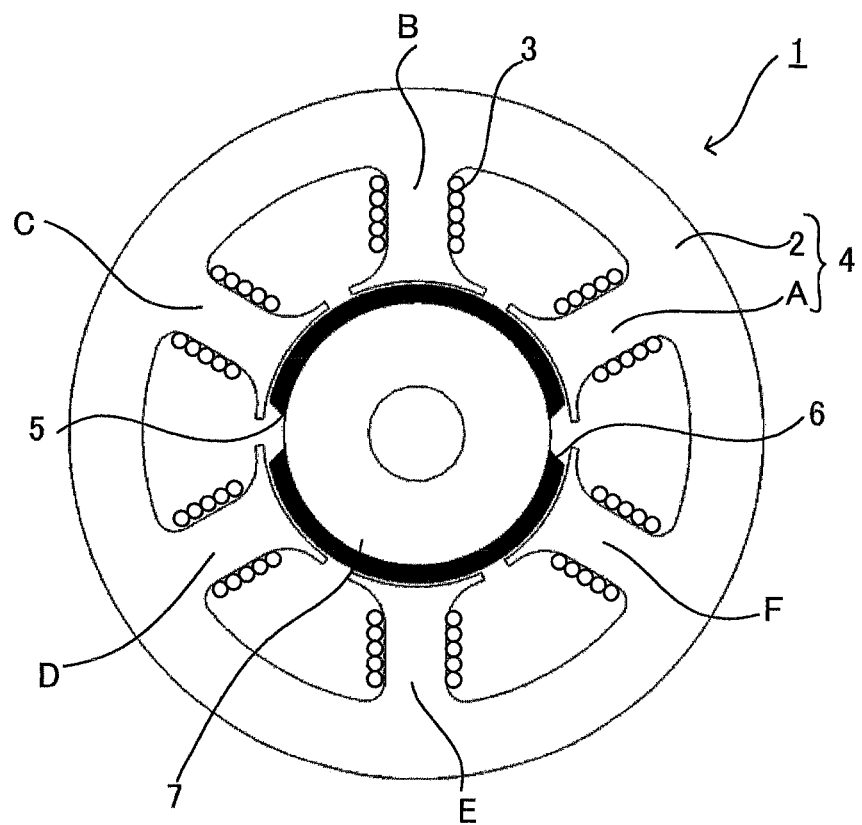
FIG. 1 is a diagram showing a structure of a permanent magnet synchronous motor 1 of the first embodiment of the present invention.

FIG. 1 shows a construction of a permanent magnet synchronous motor with two poles (a pair of poles) and six slots (the number of stator teeth: six) of the first embodiment of the present invention. As shown in FIG. 1, the permanent magnet synchronous motor 1 has a stator 4 which comprises: a stator yoke 2 made of silicon steel sheet or the like; and six pieces of stator teeth A, B, C, D, E, and F which are also made of silicon steel sheet so as to be formed integrally with the stator yoke 2 or formed in a fixable manner to the stator yoke 2. And, inside the six pieces of the stator teeth A, B, C, D, E and F, a rotor 7 is provided in a rotatable manner, the rotor 7 having permanent magnets with N pole 5 and S pole 6 in the outer circumference portion of the rotor 7.

Figure 2:
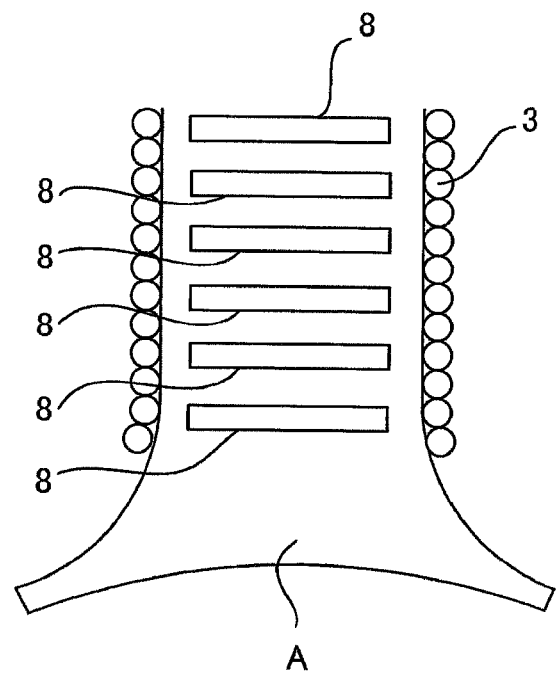
FIG. 2 is a diagram showing a construction of stator tooth A of the permanent magnet synchronous motor 1.

Around each of the six pieces of stator teeth A to F, three coils 3 are wound. FIG. 2 is a diagram showing a construction of one single stator tooth A. As shown in FIG. 2, to one single stator tooth A, each of the coils 3 is wound a predetermined winding times, and the coils 3 are connected with each other through a switch 8.

As the switch 8, a semi-conductor switching element such as a power transistor and a solid state relay can be employed. Also, a switch other than the semi conductor switching element can be employed. Further, though the switches 8 are provided on the stator tooth in the example shown in FIG. 2, the present invention is not limited to this example. The switches 8 may be provided to an outer portion of the motor 1.

Figure 3:
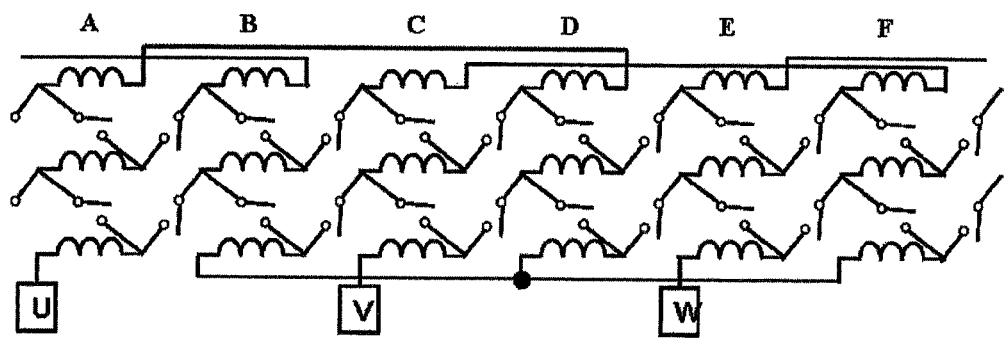
FIG. 3 is a diagram showing a connection state between a coil of each unit and switches in the stator teeth A to F.

In the present embodiment, one coil 3 of one stator tooth is connected through the switch 8 with any one of coils 3 of one adjacent stator tooth. FIG. 3 is a diagram showing a connection state between each coil 3 of each stator tooth A to F and each switch 8 in the present embodiment.

As shown in FIG. 3, in the present embodiment, two switches are connected with the end portion of a first (the most upper portion in FIG. 3) coil of each stator tooth. Also, two switches are connected with the end portion of a second (the second most upper portion in FIG. 3) coil of each stator tooth. That is, in total, four switches are connected with the coils of one single stator tooth, In order to correspond to this connection state, six switches 8 are shown in FIG. 2. However, as mentioned above, the location where the switches are provided is not limited to the location shown in FIG. 2.

Figure 4:
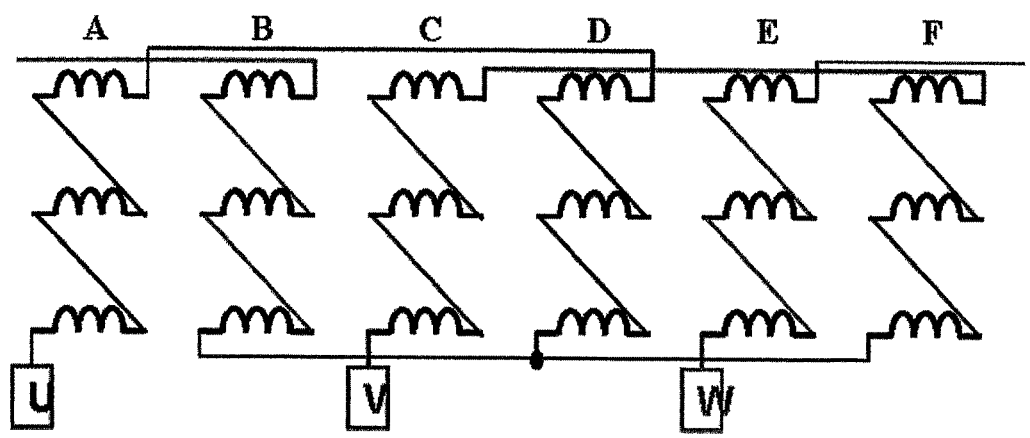
FIG. 4 is a diagram showing a connection state between coils and switches in a case that each coil of the stator teeth A to F is wound in a concentrated winding manner.
Figure 5:
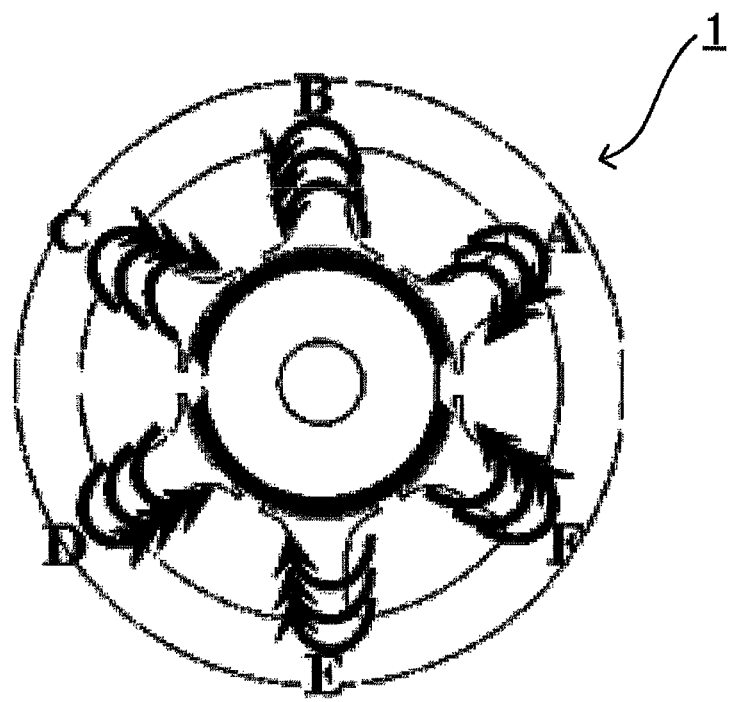
FIG. 5 is a diagram explaining that each coil of the stator teeth A to F is wound in a concentrated winding manner.

For example, as shown in FIG. 4, the switch 8 existing between the first coil 3 and the second coil 3 in each stator tooth A to F is made into an on-state, and the switch 8 existing between the second coil 3 and the third coil 3 in each stator tooth A to F is made into an on-state. The other switches 8 are made into an off-status. In this case, the coils 3 are wound in a concentrated winding state as shown in FIG. 5.

Figure 6:
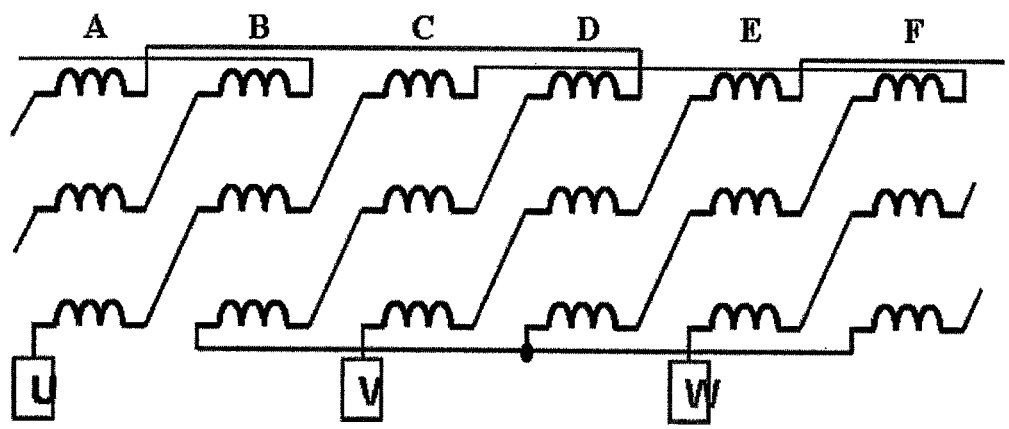
FIG. 6 is a diagram showing a connection state between coils and switches in a case that each coil of the stator teeth A to F is wound in a distributed winding manner.
Figure 7:
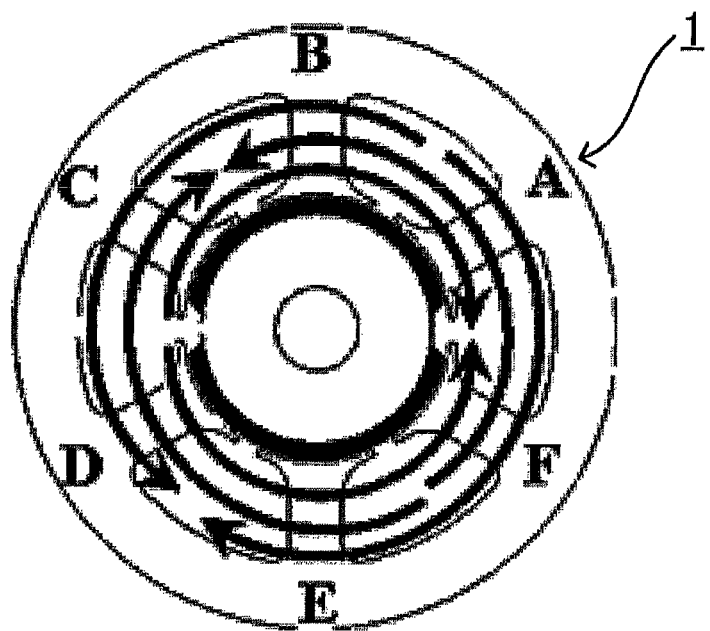
FIG. 7 is a diagram explaining that each coil of the stator teeth A to F is wound in a distributed winding manner.

Alternatively, as shown in FIG. 6, the switch 8 existing between the second coil 3 of each stator tooth A to F and the first coil 3 of the stator tooth adjacent in a counterclockwise fashion is made into an on-state, and the switch 8 existing between the third coil 3 of each stator tooth A to F and the second coil 3 of the stator tooth adjacent in a counterclockwise fashion is made into an on-state. The other switches 8 are in an off-state. In this case, the coils 3 are wound in a distributed winding (a full-pitch winding) state as shown in FIG. 7.

As mentioned above, the motor 1 of the present embodiment can control the connection state of coils 3 of each stator tooth A to F by switching the switches 8 between on and off. In the present embodiment, the connection state of the coils 3 is controlled by a control device shown in FIG. 8.

Figure 8:
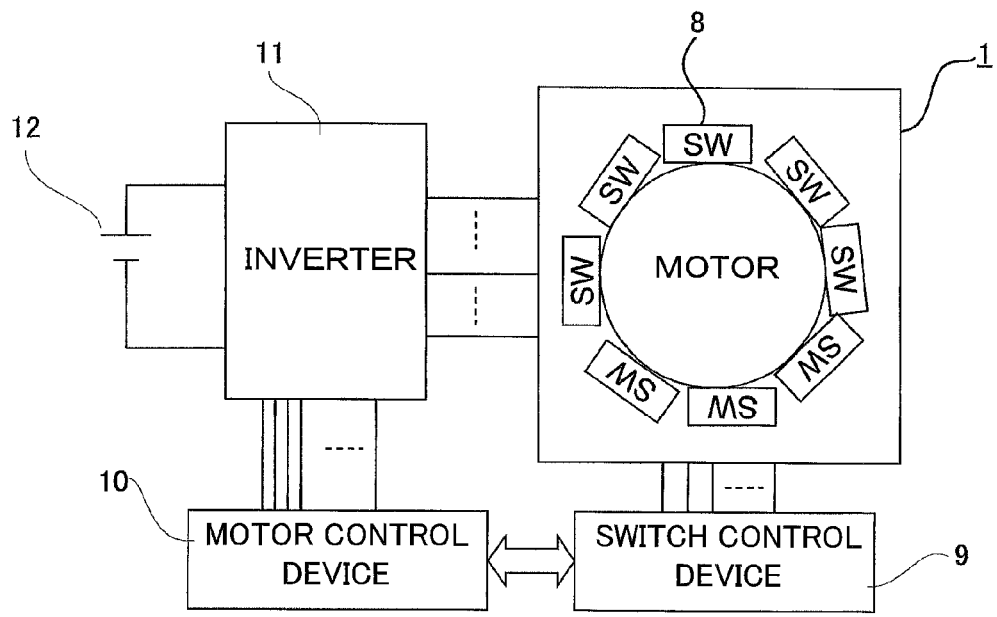
FIG. 8 is a block diagram showing a construction of control device of the permanent magnet synchronous motor 1.

As shown in FIG. 8, a switch control device 9 is connected with each switch 8, and a motor control device 10 is connected with the switch control device 9. The motor control device 10 outputs to the switch control device 9 data in accordance with a pattern of on and off of each switch 8, and the switch control device 9 turns on or off each switch 8 based on the data.

An inverter 11 is connected with the motor control device 10, and the output of the inverter 11 is connected with input terminals of the coils 3 of each stator tooth A to F. The inverter 11 of the present embodiment is a three-phase output inverter using six switching elements. The inverter 11 executes PWM switching based on control signals from the motor control device 10, and converts direct current supplied from a battery 12 into three-phase alternately current and applies the current to the coils 3. As the result of that, the rotating speed of the motor 1 can be controlled and output torque can be controlled.

In the present embodiment, because the three-phase motor 1 is employed, three-phase output inverter is used as the inverter 11. However, the present invention is not limited to this example. In a case that a motor with more than three phases is used, an inverter may be used as appropriate.

As an example, there will be described a case that the rotating speed and output torque of the motor 1 are controlled, while the connection states of coils 3 of each stator tooth A to F are switched between the concentrated winding and the distributed winding. First, By outputting data from the motor control device 10 to the switch control device 9, all of the switches 8 between the coils 3 of each stator tooth A to F are moved into an on-state, and the coil 3 of each unit in each stator tooth A to F is connected each other in series as shown in FIG. 4. The other switches are made into off.

Figure 9:
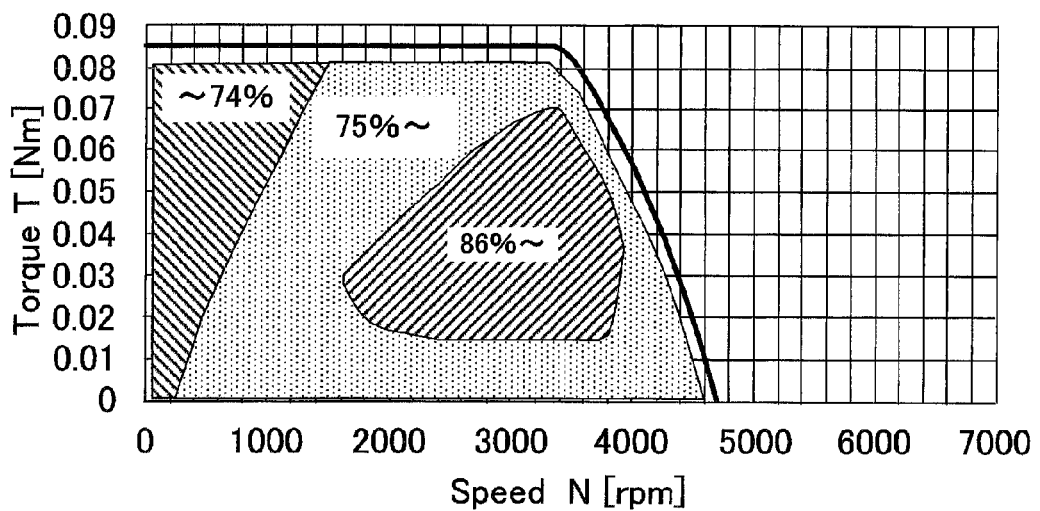
FIG. 9 is a diagram showing characteristics in a case that each coil of the stator teeth A to F is wound in a concentrated winding manner.

In this case, the three coils 3 of each stator tooth A to F are made into the concentrated winding state where the coils 2 are connected in series. Because of this, this case becomes three times a case of one coil in the interlinkage flux, and it is possible to realize high torque as shown in FIG. 9. However, as the induced voltage becomes also high, the rotating speed is limited.

Next, By outputting data from the motor control device 10 to the switch control device 9, the switches 8 existing between the coils 3 of adjacent stator teeth are made into an on-state in order to connect the coils 3 of adjacent stator teeth in series as shown in FIG. 6. All of the switches 8 existing between the coils 3 within each stator tooth are made in an off-state.

In this case, the coils 3 are made into the distributed winding state. For example, in the U phase, as each one coil 3 of the stator tooth A, the stator tooth B, and the stator tooth C are connected in series, the magnetic flux of the U phase is a sum of magnetic flux of the stator tooth A, magnetic flux of the stator tooth B, and magnetic flux of the stator tooth C.

Figure 10:
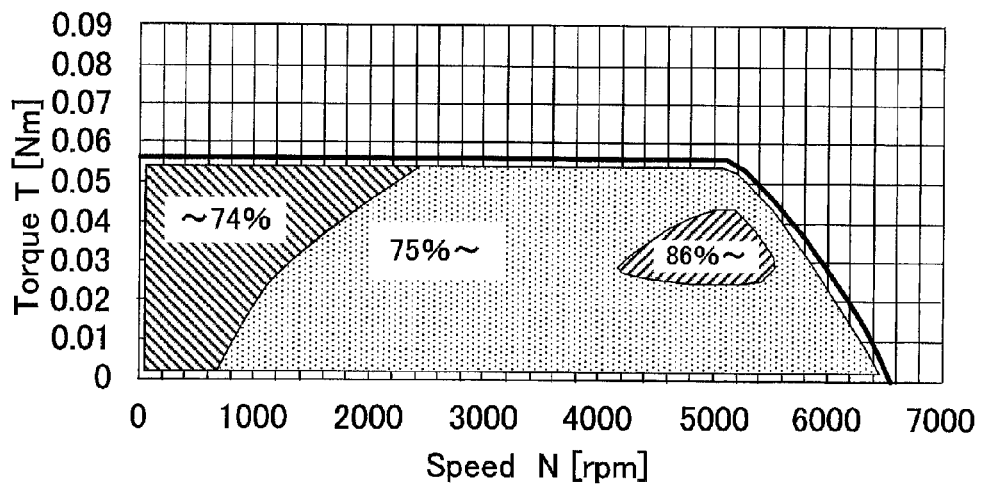
FIG. 10 is a diagram showing characteristics in a case that each coil of the stator teeth A to F is wound in a distributed winding manner.
Figure 11:
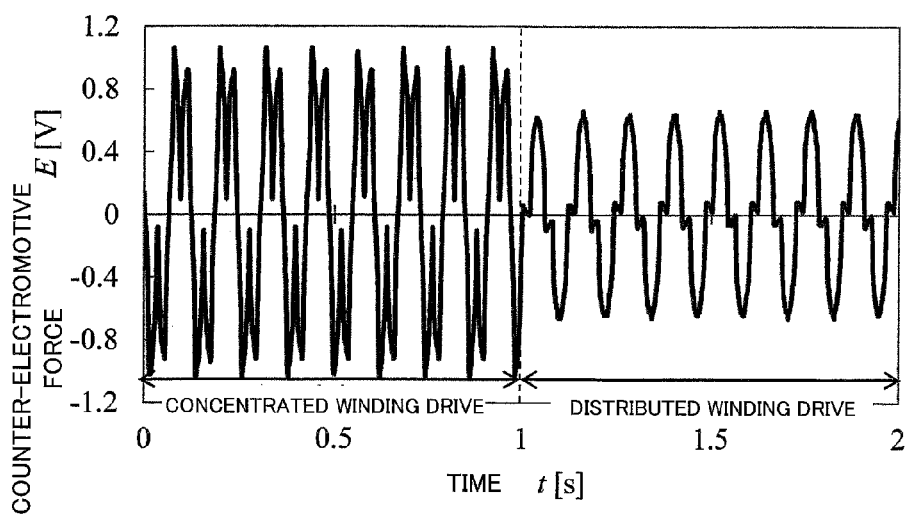
FIG. 11 is a diagram showing a change of induced voltage in a case that the coils are changed from a concentrated winding state to a distributed winding state while the permanent magnet synchronous motor 1 is driving.

As a result of that, as one coil is connected with another coil existing adjacent stator tooth, in comparison with a case shown in FIG. 4, the number of windings is one third, but the rate of utilization of windings (the wounding factor) increases and the rate of utilization doubles. Because of this, as shown in FIG. 10, this case is two thirds the concentrated winding case in torque, and also it is possible to increase the upper limit of rotating speed because the induced voltage decreases. FIG. 11 shows a graph showing a state that the induced voltage decreases at the moment when the connection state of coils is switched from the concentrated winding state to the distributed winding state during rotating.

As mentioned above, it is possible for the motor control device of the present invention to utilize both of characteristics shown in FIG. 9 and characteristics shown in FIG. 10 by switching the winding state of coils between the concentrated winding state shown in FIG. 4 and the distributed winding state shown in FIG. 6. Namely, by just a single motor, it is possible to provide a plurality of driving characteristics and improve the output range. Further, in a driving area both of the states can cover, it is possible to improve efficiency by selecting a more efficient driving method.

In a case that an actual control is executed, depending on the characteristics of the motor and the like, a predetermined criterion value is set for the rotating speed or the torque, and by setting the criterion value as a threshold value, the winding state of coils may be switched between the concentrated winding and the distributed winding.

In the present embodiment, though described is an example that two switches are provided to one same end portion of each of the first and second coils of each stator tooth, the present invention is not limited to this example. A switch can be provided to both end portions of each unit. One switch can be provided between the one end portion of the first coil and the one end portion of the second coil, and one switch can be provided between the other end portion of the second coil and the end portion of the third coil. Namely, as long as it can be realized that the connection state of coils is switched as mentioned above, the number of switches and the location of switches are not limited.

The Second Embodiment

Figure 12:
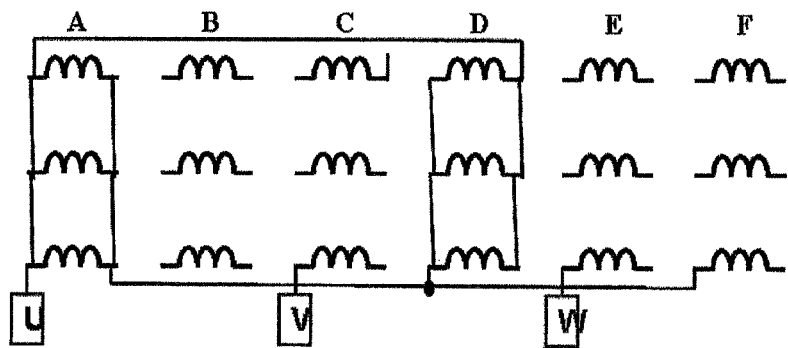
FIG. 12 is a connection diagram of the concentrated winding coils connected in parallel in a second embodiment of the present invention.

FIG. 12 is a connection diagram of concentrated winding coils connected in parallel in the second embodiment of the present invention. As one example, the connection state of only the U phase is shown. In this example, the switches 8 are provided to both end portions of three coils 3 of each of the stator teeth A to F, and all of the both end portions of the three coils 3 are connected. As a result of that, the coils 3 become a state of concentrated winding coils connected in parallel.

In a case that the state of coils 3 is made into the concentrated winding coils connected in parallel in this way, as the induced voltage becomes one sixth in comparison with a case of concentrated winding coils connected in series shown in FIG. 4, driving with further higher speed is possible. The current to be applied to a coil is determined depending on a diameter of the coil. However, in this case, as it is possible to apply current six times as much as the case of the concentrated winding coils connected in series, there are no ineffectual coils shown in the patent literatures 1 and 2, and torque is not reduced. Further, in comparison with the case of concentrated winding coils connected in series, the resistance value also becomes one sixth. Because of this, it is possible to decrease the copper loss, and thereby the efficiency is improved.

Incidentally, in order to realize the connection state of the coils of the present embodiment, two switches may be provided to each of both end portions of the coils of each stator tooth. Alternatively, the connection state of switches with respect to each coil of the first embodiment may be changed so as to connect the coils in parallel. In this case, it is necessary to connect a new switch with an end portion of each coil, the end portion being not connected with any switch in FIG. 3.

[The Third Embodiment]

Figure 13:
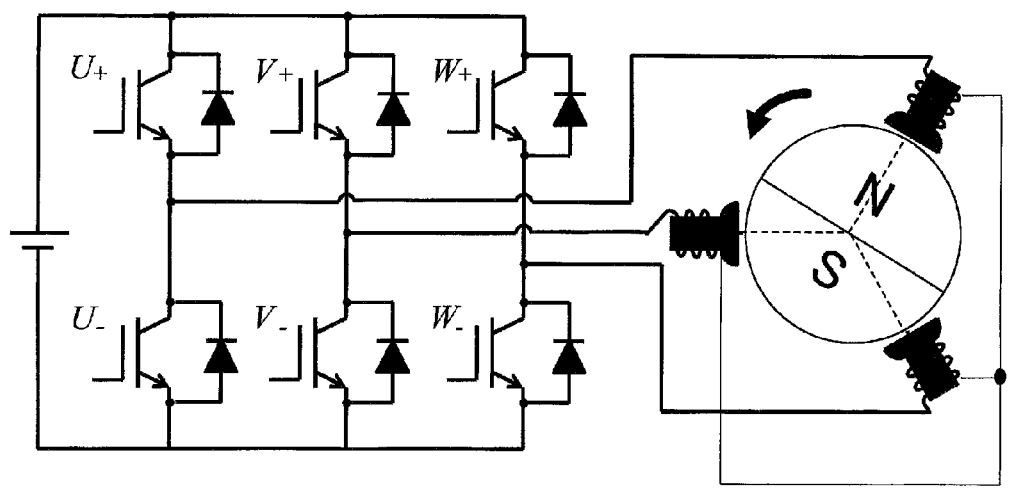
FIG. 13 is a diagram for explaining a three-phase inverter for motor driving in a third embodiment of the present invention.

FIG. 13 shows a construction of a three-phase inverter for motor driving, and

Figure 14:
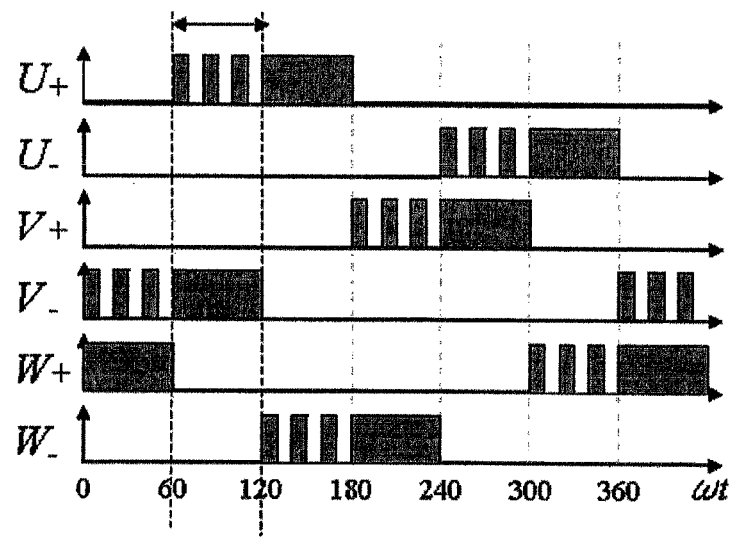
FIG. 14 is a diagram showing an example of driving of an inverter.
Figure 15:
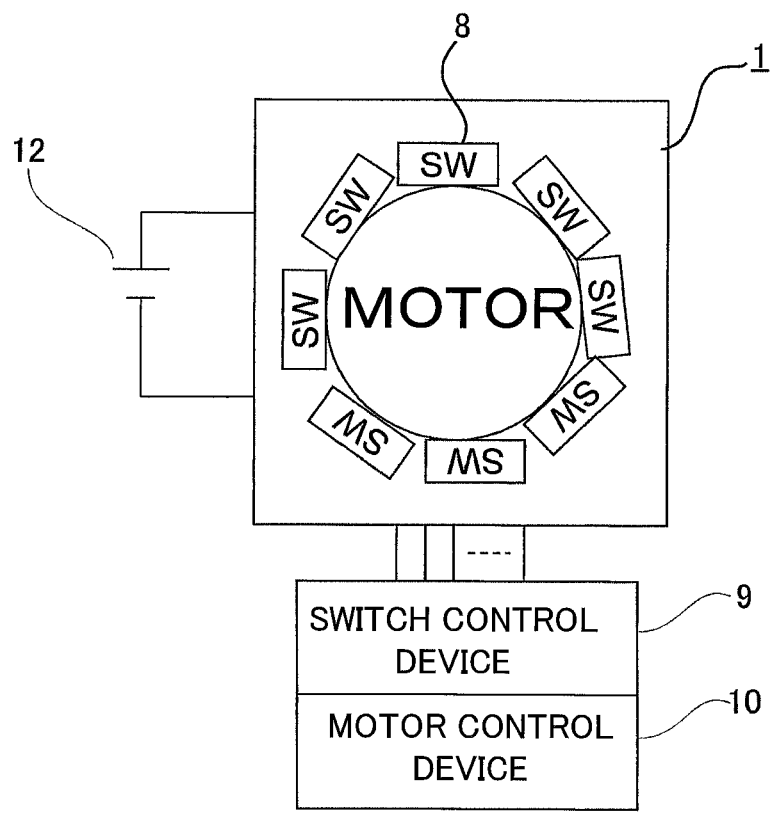
FIG. 15 is a block diagram showing a construction of a control device of the motor 1 according to the third embodiment of the present invention.

FIG. 14 shows switching patterns of a 120-degree current supply system as a simple example of driving the inverter shown in FIG. 13. In the third embodiment of the present invention is, as shown in FIG. 15, functions of the inverter are realized by turning on and off the switches 8 without providing the inverter to the outer portion of the motor 1.

Figure 16:
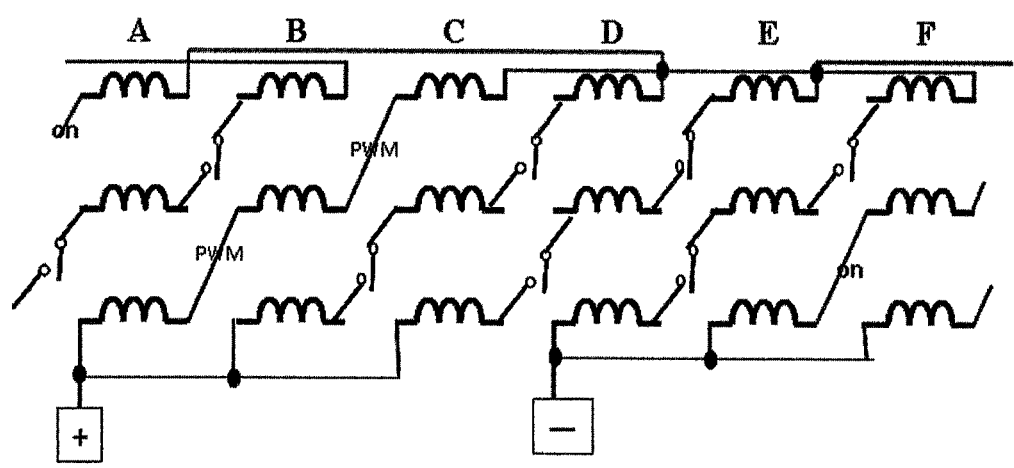
FIG. 16 is a diagram showing a connection state between coils and switches according to the third embodiment of the present invention.

Specifically, as shown in FIG. 16, one end of phase U consisting of a third coil 3 of the stator tooth A, a second coil 3 of the stator tooth B, and a first coil 3 of the stator tooth C is connected with a plus terminal. The other end of the first coil of the stator tooth C is connected with a neutral point. Further, one end of the phase V consisting of a third coil 3 of the stator tooth E, a second coil 3 of the stator tooth F, and a first coil 3 of the stator tooth A is connected with a minus terminal.

In this connection state, in a section from 60-degree to 120-degree shown in FIG. 14, the PWM switching is executed in such a way that the state of on and off having a certain proportion is repeated with respect to a switch 8 corresponding to a switch U+ shown in FIG. 12. The switch 8 corresponding to a switch V− shown in FIG. 13 is made into an on-state.

Namely, the PWM switching is executed in such a way that the state of on and off having a certain proportion is repeated, with respect to the switch 8 connecting the third coil 3 of the stator tooth A, and the second coil 3 of the stator tooth B and the switch 8 connecting the second coil 3 of the stator tooth B and the first coil 3 of the stator tooth C.

The switch 8 connecting the third coil 3 of the stator tooth E and the second coil 3 of the stator tooth F and the switch 8 connecting the second coil 3 of the stator tooth F and the first coil 3 of the stator tooth A are made into an on-state.

By executing the control above mentioned, in the section between 60-degree and 12-degree shown in FIG. 14, the current flows from the plus terminal of direct-current power source in the following order: U+; the third coil 3 of the stator tooth A; the second coil 3 of the stator tooth B; the first coil 3 of the stator tooth C; the neutral point; the first coil 3 of the stator tooth A; the second coil 3 of the stator tooth F; the third coil 3 of the stator tooth E; V−; and the minus terminal.

As mentioned above, according to the present embodiment, without providing an inverter outside the motor 1, by executing the PWM switching to and turning on predetermined switches in a predetermined section, it is possible to realize functions of an inverter. Accordingly, it is possible to downsize the system.

[The Fourth Embodiment]

Figure 17:
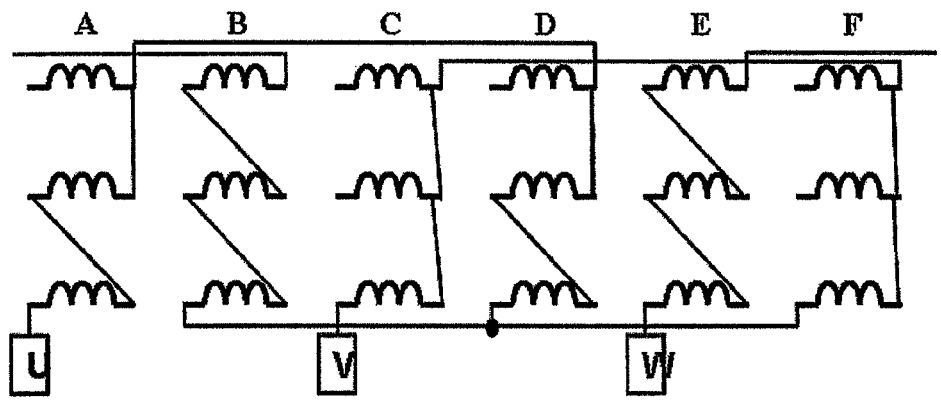
FIG. 17 is a diagram showing a connection state between coils and switches according to a fourth embodiment of the present invention.

FIG. 17 shows the fourth embodiment where the coils 3 are connected with each other in a different way for each phase. For example, In order to reduce the induced voltage of the V phase, by the connection method shown in FIG. 17, only two of six coils in the V phase, that is, the third coil 3 of the stator tooth C and the third coil 3 of the stator tooth F provide interlinkage magnetic flux.

In the example shown in FIG. 16, in the U phase, four coils, which are the third and second coils 3 of the stator tooth A and the second and third coils 3 of the stator tooth D provide interlinkage magnetic flux.

Further, in the W phase, six coils, which are all coils 3 of the stator tooth E and all coils 3 of the stator tooth B provide interlinkage magnetic flux.

In this way, it is possible to make the induced voltage into a sine wave by switching the connection method of coils minutely according to a request.

By making the induced voltage into a sine wave, as sine-wave current flows, it is possible to decrease the torque ripple and decrease the iron loss. On the contrary, as each phase is capable of generating harmonic independently, for example, it is also possible to improve a peak value of the torque.

in order to realize the connection state of coils of the present embodiment, the connection state of switches may be changed or a switch may be increased, so that one of end portions of the second coil of each stator tooth, the end portion being connected with an end portion of the first coil of another stator tooth adjacent to the stator tooth, is connected with a corresponding end portion of the first coil of the same stator tooth. In the same way, the connection state of switches may be changed or a switch may be increased, so that one of end portions of the third coil of each stator tooth, the end portion being connected with an end portion of the second coil of another stator tooth adjacent to the stator tooth, is connected with a corresponding end portion of the second coil of the same stator tooth.

[The Fifth Embodiment]

Figure 18:
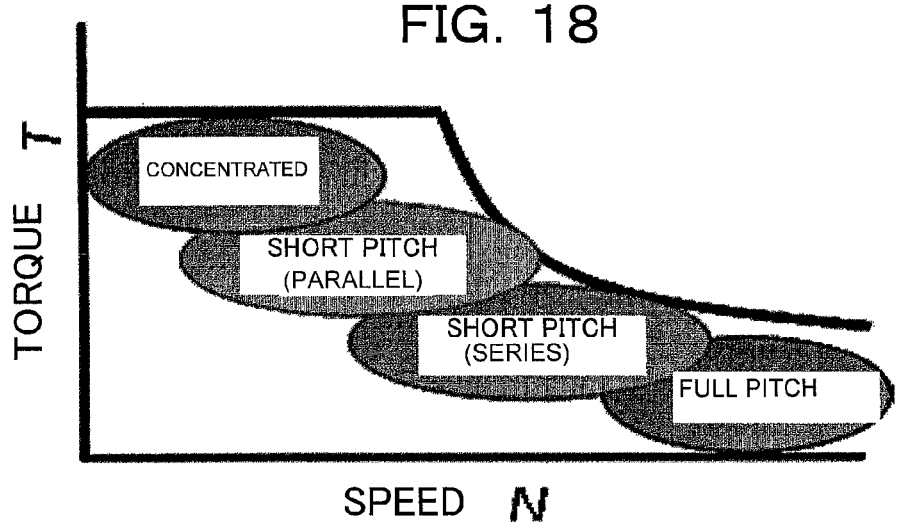
FIG. 18 is a diagram showing a state that a connection state of coils is changed depending on a driving range according to a fifth embodiment of the present invention.

As mentioned above, it is indicated that given characteristics can be output by a given connection state of coils. FIG. 18 shows a construction example of the fifth embodiment of the present invention where a connection states of coils is changed depending on the driving range.

As shown in FIG. 18, in the present embodiment, the full-pitch winding (the distributed winding) state is provided in a high-speed and low-torque area, the concentrated winding state is provided in a low-speed and high-torque area, and between the areas, a state is switched between the distributed winding coils connected in series and the distributed winding coils connected in parallel. As a result of that, it is possible to provide the output range which cannot be provided by a single motor. The switching method is not limited to the example of FIG. 17, and it is possible to select an appropriate method depending on a construction of a motor.

[The Sixth Embodiment]

Figure 19:
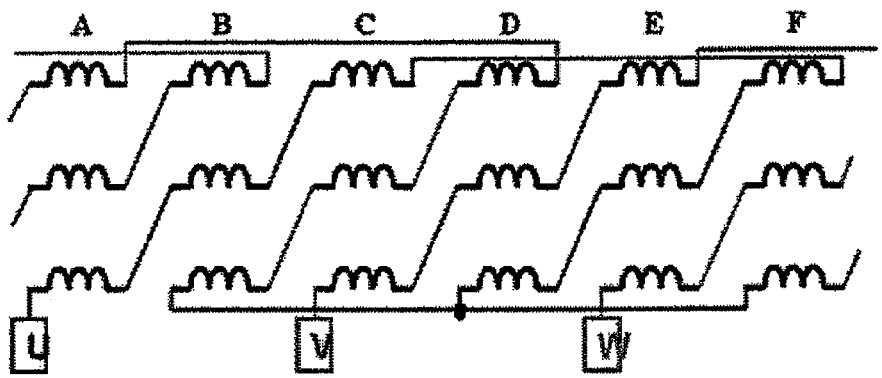
FIG. 19 is a diagram showing a connection state between coils and switches according to a sixth embodiment of the present invention.
Figure 20:
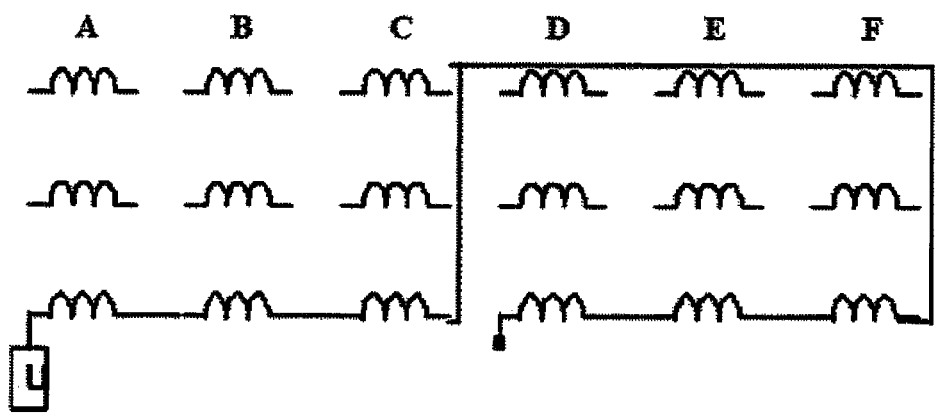
FIG. 20 is a diagram showing a connection state where the number of coils of each unit included in each phase is not equal to each other.
Figure 21:
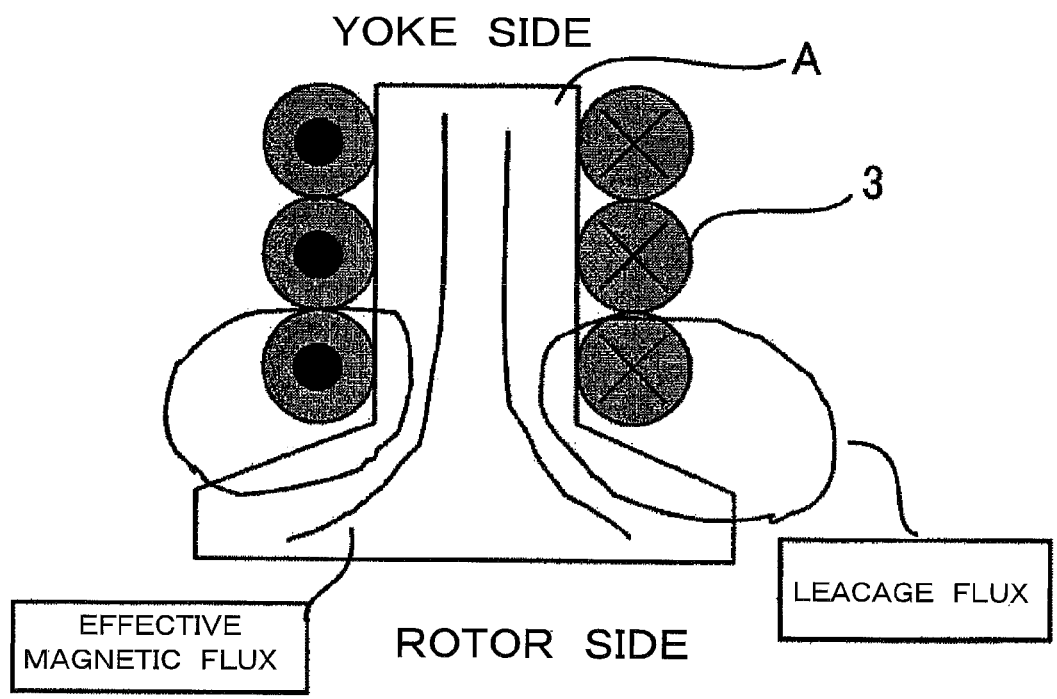
FIG. 21 is a diagram showing a difference in influence of leakage flux between coils wound in the rotor side of the stator teeth and coils wound in the stator yoke side of the stator teeth, in a case that the coils are connected as seen in FIG. 20.

FIGS. 19 and 20 show connecting constructions of coils of the sixth embodiment. When the coils are connected with each other as shown in FIG. 20, as shown in FIG. 21, the coil 3 wound around a rotor-side part of the stator tooth has bigger influence of leakage flux than the coil 3 wound around a stator-yoke-side part of the stator tooth. As a result of that, unbalance among the phases is generated.

Then, in the present embodiment, as shown in FIG. 19, when adjacent stator teeth are connected with each other, positionally different coils are connected with each other so that the number of coils of each unit included in each phase is equal to each other.

In the example shown in FIG. 19, the coils connecting adjacent stator teeth are positionally different from each other. With respect to each phase, each of the number of first coils, the number of second coils, and the number of third coils is two.

According to the present invention, as the number of coils located at the rotor-side part and the number of coils located at the stator-yoke-side part are equal to each other, it is possible to obviate the unbalance among phases.

In each of the embodiments mentioned above, in a case that a coil of one stator tooth and the other coil of the other stator tooth are connected with each other through a switch, only a case that coils of adjacent stator teeth are connected with each other has been described. However, the present invention is not limited to such case. By providing more switches, the coils may be connected in various combinations.

Additionally, in each of the embodiments mentioned above, a case that three coils are wound around a single stator tooth has been described. However, the present invention is not limited to such case. It is enough that at least two coils are wound around a single stator tooth. So, it will do that at least three coils are wound.

Further, in each of the embodiments mentioned above, a case that one switch is provided between coils has been described. However, the present invention is not limited to such case. Switches may be provided to both ends of each coil, and other variations can be available as appropriate.

In the present invention, coils may be wound around a stator tooth of a stator where a stator yoke and the stator tooth are unified. Or, after a coil is wound around a stator tooth, the stator tooth may be joined with a stator yoke. Namely, it is possible to realize the present invention as the stator teeth where coils are wound as mentioned above and switches are provided as mentioned above, and as the stator having such stator teeth, and further, as the motor having such stator.

[The Seventh Embodiment]

Next, based on FIGS. 22 to 24, the seventh embodiment of the present invention will be described.

The present embodiment is an example that a switch for switching the connection state of adjacent coils wound around a single stator tooth, or a switch for switching the connection state of coils wound around adjacent stator teeth respectively is constructed as a bi-directional switch using MOSFETs.

Figure 22:
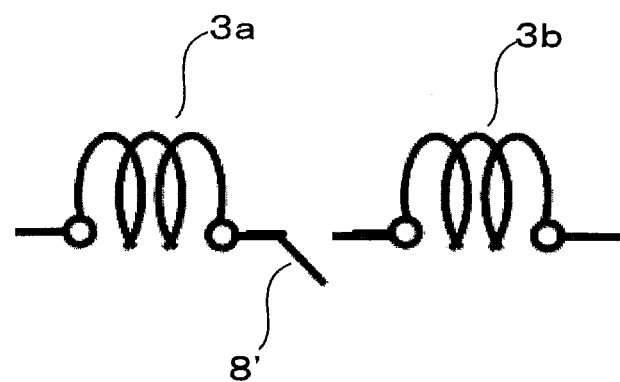
FIG. 22 is a diagram showing coils and switches in a seventh embodiment of the present invention.

Coils 3a and 3b shown in FIG. 22 indicate two coils wound around a single stator tooth, or a coil wound around one stator tooth and a coil wound around the other stator tooth adjacent to the one stator tooth. One end of a bi-directional switch 8' is connected with one end of the coil 3a, and the other end of the bi-directional switch 8' is connected with one end of the coil 3b.

Figure 23:
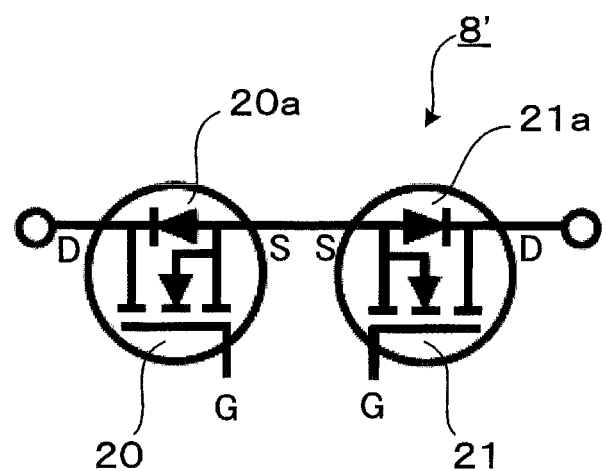
FIG. 23 is a diagram showing a bidirectional switch in the seventh embodiment.

FIG. 23 shows a construction of the bi-directional switch 8'. As shown in FIG. 23, the bi-directional switch 8' of the present invention comprises an N-type MOSFET 20 and another N-type MOSFET 21. A source terminal S of the N-type MOSFET 20 and a source terminal S of the N-type MOSFET 21 are connected with each other. A drain terminal D of the N-type MOSFET 20 is connected with one end of the coil 3a, and a drain terminal D of the N-type MOSFET 21 is connected with one end of the coil 3b.

Further, as shown in FIG. 23, a parasitic diode 20a is formed in the N-type MOSFET 20, and a parasitic diode 21a is formed in the N-type MOSFET 21.

Figure 24:
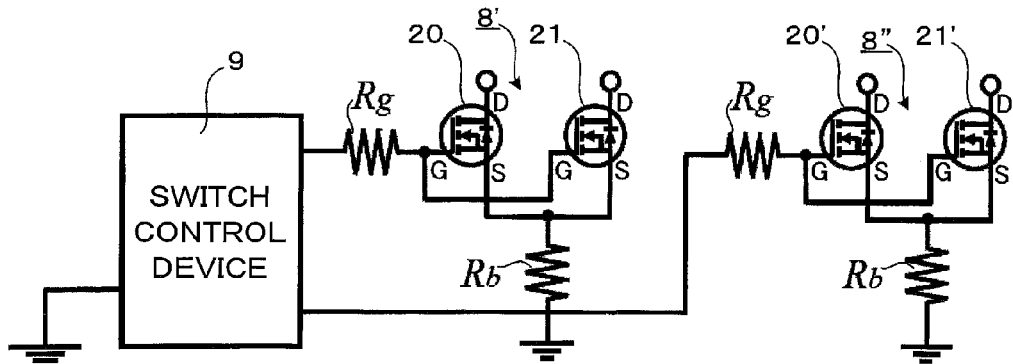
FIG. 24 is a diagram showing a control circuit of the bidirectional switch in the seventh embodiment.

FIG. 24 is a diagram showing a control circuit of the bi-directional switches 8', 8". As shown in FIG. 24, gate terminals of the MOSFET 20 and the MOSFET 21 of the bi-directional switch 8' are connected with a switch control device 9 through a gate resistance Rg. Source terminals of the MOSFET 20 and the MOSFET 21 are connected to ground through a current breaking resistance Rb. In the same way, gate terminals of the MOSFET 20' and the MOSFET 21' of the bi-directional switch 8" are connected with a switch control device 9 through a gate resistance Rg. Source terminals of the MOSFET 20' and the MOSFET 21' are connected to ground through a current breaking resistance Rb.

The switch control device 9 is not illustrated in FIG. 24. However, the switch control device 9 is connected with the motor control device 10 shown in FIG. 8 or FIG. 15, and switches a state of MOSFET between on and off based on control data output from the motor control device 10.

Next, the operation of circuits of the present embodiment will be described based on FIGS. 22 to 24. As one example, there will be described about a case that the bi-directional switch 8' is made into an on-state, and the bi-directional switch 8" is made into an off-state.

The switch control device 9 is made to apply high level voltage to the gate terminals of the MOSFET 20 and the MOSFET 21, and to apply low level voltage to the gate terminals of the MOSFET 20' and the MOSFET 21'.

As a result of that, the MOSFET 20 and the MOSFET 21 are made into an on-state, and the MOSFET 20' and the MOSFET 21' are made into an off-state.

Alternating current is applied to each coil. First, in a case that the current flows in a direction from the coil 3a to the coil 3b, the current is inputted from the coil 3a to the drain terminal of the MOSFET 20, goes through a channel formed in the MOSFET 20 of an on-state, and reaches the source terminal of the MOSFET 20.

Further, the current is inputted to the source terminal of the MOSFET 21, and flows into the coil 3b through the parasitic diode 21a of the MOSFET 21.

Next, in a case that the current flows in a direction from the coil 3b to the coil 3a, the current is inputted to the drain terminal of the MOSFET 21 from the coil 3b, goes through a channel formed in the MOSFET 21 of on-state, and reaches the source terminal of the MOSFET 21.

Further, the current is inputted to the source terminal of the MOSFET 20, and flows into the coil 3a through the parasitic diode 20a of the MOSFET 20.

With respect to the MOSFET 20' of an off-state and the MOSFET 21' of an off-state, as a channel is not formed in each of the MOSFETs, the current does not flow into the coils. Further, as the parasitic diodes formed in each of the MOSFET 20' and the MOSFET 20" are formed so that the directions of parasitic diodes are in a direction opposite to both coils, the current does not flow into the coils.

If this switch existing between the coils is constructed by a single MOSFET, not using the bi-directional switch, current may flow in either of directions because of the parasitic diode formed in the MOSFET though the MOSFET is in an off-state.

However, in the present embodiment, as mentioned above, as the bi-directional switch is employed as the switch existing between coils, it is possible to control definitely to connect with and disconnect from the coils.

The gate resistance Rg is a resistance for controlling the speed of switching between on and off of the MOSFET 20' or the MOSFET 21'. The resistance value of the gate resistance Rg is set depending on the characteristics of the MOSFET employed. Specifically, the resistance value is around a few $\Omega$.

The current breaking resistance Rb is provided to prevent the following case: current from the bi-directional switch of an on-state flows into the bi-directional switch of an off-state through a ground line, and further, flows into the coil connected with the bi-directional switch of an off-state.

For example, it is assumed that the MOSFET 20 and MOSFET 21 of the bi-directional switch 8' are in an on-state and current flows from the coil 3a to the coil 3b through the MOSFET 20 and the MOSFET 21.

In this case, if the current breaking resistance does not exist, the current flows from the source terminal of the MOSFET 20 not only to the source terminal of the MOSFET 21, but also to the parasitic diode of the MOSFET 21' of the bi-directional switch 8' of an off-state through the ground line to flow into the coil connected with the MOSFET 21'.

However, by installing the current breaking resistance Rb, it is possible to break the current flowing from the source terminal of the MOSFET 20 to the ground line. Accordingly, it is possible to prevent inconvenient occurrence mentioned above.

As the current breaking resistance Rb is used for the aim like that, the current breaking resistance of a few M$\Omega$ is employed.

As the MOSFET, a silicon(Si)-based one may be employed. However, if a silicon-carbide (SiC)-based one or a gallium-nitride (GaN)-based one is employed, the resistance decreases, and larger current is possible to flow.

The bi-directional switch of the present invention can be applied to the switch of any one of embodiments mentioned above. Further, though in the present embodiment, there has been described a case that the N-type MOSFET is employed, a P-type MOSFET can be also employed.

[The Eighth Embodiment]

Figure 25:
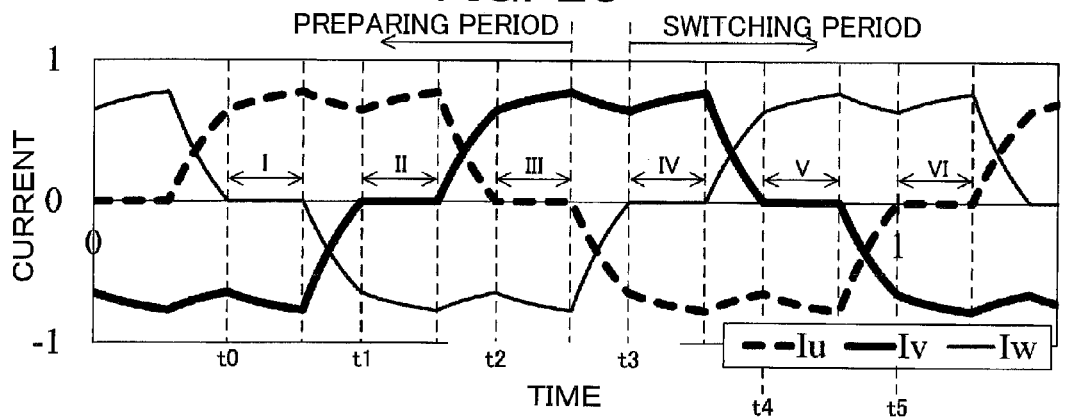
FIG. 25 is a diagram showing a waveform of three-phase alternate current applied to a rotating electric machine of an eighth embodiment of the present invention.

Next, there will be described the eighth embodiment of the present invention based on FIGS. 25 to 35. The present embodiment relates to a method of switching the motor of the present invention from the concentrated winding drive to the distributed winding drive, without generating a period that the current does not flow into any coil of the stator teeth in a period other than a period that the current of each phase becomes zero FIG. 25 shows a waveform of current applied to each phase of the motor of the present invention during the 120-degree energizing drive. In FIG. 25, the waveform represented as a dashed line is the current Iu flowing in the U phrase. Further, the waveform represented as a bold solid line is the current Iv flowing in the V phase. Then, the waveform represented as a thin sold line is the current Iw flowing in the W phase.

Figure 26:
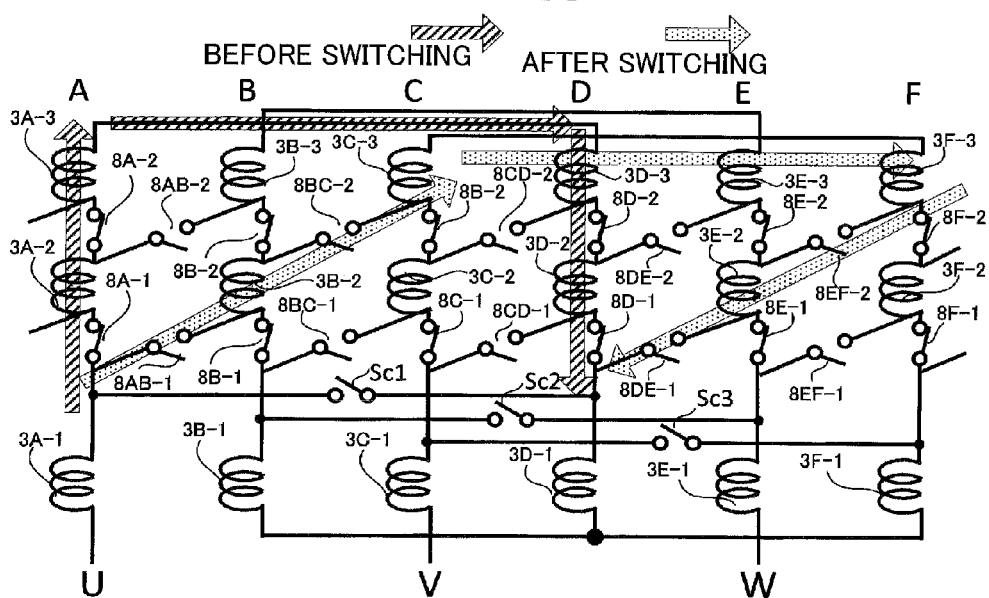
FIG. 26 is a circuit diagram of the rotating electric machine in the eighth embodiment of the present invention.

As shown in FIG. 25, with respect to the current of the phases, there are six times of current zero periods I to VI in one cycle of electrical angle. In the present embodiment, at preparing periods I to III, the coils composing the concentrated winding state are disconnected from each other, and also common windings which are windings common in the concentrated winding and the distributed winding are connected with each other. At switching periods IV to VI, the coils are connected with each other so as to compose the distributed winding state, and also the common windings are disconnected from each other, FIG. 26 is a circuit diagram of the motor of the present invention. As shown in FIG. 26, around the stator tooth A and the stator tooth D where the current of U phase flows, three coils 3A-1, 3A-2, 3A-3 and three coils 3D-1, 3D-2, 3D-3 are wound respectively.

The coils 3A-1 and 3A-2 are connected with and disconnected from each other by the switch 8A-1, and the coils 3A-2 and 3A-3 are connected with and disconnected from each other by the switch 8A-2. In the same way, the coils 3D-1 and 3D-2 are connected with and disconnected from each other by the switch 8D-1, and the coils 3D-2 and 3D-3 are connected with and disconnected from each other by the switch 8D-2.

Further, around the stator tooth C and the stator tooth F where the current of V phase flows, three coils 3C-1, 3C-2, 3C-3 and three coils 3F-1, 3F-2, 3F-3 are wound respectively.

The coils 3C-1 and 3C-2 are connected with and disconnected from each other by the switch 8C-1, and the coils 3C-2 and 3C-3 are connected with and disconnected from each other by the switch 8C-2. In the same way, the coils 3F-1 and 3F-2 are connected with and disconnected from each other by the switch 8F-1, and the coils 3F-2 and 3F-3 are connected with and disconnected from each other by the switch 8F-2.

Further, around the stator tooth E and the stator tooth B where the current of W phase flows, three coils 3E-1, 3E-2, 3E-3 and three coils 3B-1, 3B-2, 3B-3 are wound respectively.

The coils 3E-1 and 3E-2 are connected with and disconnected from each other by the switch 8E-1, and the coils 3E-2 and 3E-3 are connected with and disconnected from each other by the switch 8E-2. In the same way, the coils 3B-1 and 3B-2 are connected with and disconnected from each other by the switch 8B-1, and the coils 3B-2 and 3B-3 are connected with and disconnected from each other by the switch 8B-2.

The coils of stator tooth A and the coils of stator tooth B are connected with and disconnected from each other by the switch 8AB-1 and the switch 8AB-2. The coils of stator tooth B and the coils of stator tooth C are connected with and disconnected from each other by the switch 8BC-1 and the switch 8BC-2.

The coils of stator tooth C and the coils of stator tooth D are connected with and disconnected from each other by the switch 8CD-1 and the switch 8CD-2. The coils of stator tooth D and the coils of stator tooth E are connected with and disconnected from each other by the switch 8DE-1 and the switch 8DE-2.

The coils of stator tooth E and the coils of stator tooth F are connected with and disconnected from each other by the switch 8EF-1 and the switch 8EF-2. Although the illustration is omitted in FIG. 26, the coils of the stator tooth F and the coils of the stator tooth G are connected with and disconnected from each other by two switches in the same way.

In the present embodiment, the switches Sc1, Sc2, and Sc3 are located between the common windings which are commonly used in the concentrated winding state and the distributed winding state, and each of the switches Sc1, Sc2, and Sc3 connects the common windings with each other and disconnects the common windings from each other Specifically, the coil 3A-1 and the coil 3D-1 which are the common windings are connected with and disconnected from each other by the switch Sc1. The coil 3B-1 and the coil 3E-1 which are the common windings are connected with and disconnected from each other by the switch Sc2. The coil 3C-1 and the coil 3F-1 which are the common windings are connected with and disconnected from each other by the switch Sc3.

As shown in FIG. 26, in the present embodiment, the concentrated winding state that the coils of each stator tooth are connected in series is a state before the switching. The current flows in a direction of an arrow hatched. FIG. 26 shows an example of current flowing in the U phase.

The current flowing in the U phase, as shown in FIG. 25, moves into a current zero period at the preparing period III. Then, in the present invention, in the current zero period, each of the switches 8A-1, 8A-2, 8D-2, and 8D-1 is made into an off-state, so that the six coils connected in series 3A-1, 3A-2, 3A-3, 3D-3, 3D-2, and 3D-1 are disconnected from each other.

Further, by moving the switch Sc1 into an on-state, the common windings 3A-1 and 3D-1 are connected with each other. By connecting the common windings in this way, in the period that minus current flows after the period III shown in FIG. 25, three times more current flows in the common windings than the current flowing before the period III.

Next, as shown in FIG. 25, the current of V phase moves into a current zero period at the switching period VI. In this period, in order to connect the coils of stator teeth A, B, C, F, E, and D with each other, each of the switches 8AB-1, 8BC-1, 8EF-1, and 8DE-1 are made into an on-state.

Then, by making the switch Sc1 into an off-state, the common windings 3A-1 and 3D-1 are disconnected from each other.

In this way, when a state of coils of each stator tooth is the distributed winding state, the current flows like an arrow dotted in FIG. 26.

After that, in the same way, with respect to each phase, the switching from the concentrated winding to the distributed winding is performed.

In the present embodiment, as mentioned above, when the current of each phase is zero, the switching from the concentrated winding to the distributed winding is performed. Accordingly, a voltage spike does not occur at the moment of the switching, and it is possible to perform the switching without loss.

As the present embodiment is constructed so that the common windings are connected with each other before the switching, in a period with respect to each phase from a period when the current becomes zero to a next period the current becomes zero, the current flows in the common windings three times more than before. Flowing current is not different in total current of each phase from current flowing before the common windings are connected. Thereby, this embodiment does not make a trill-ripple to occur.

Figure 33:
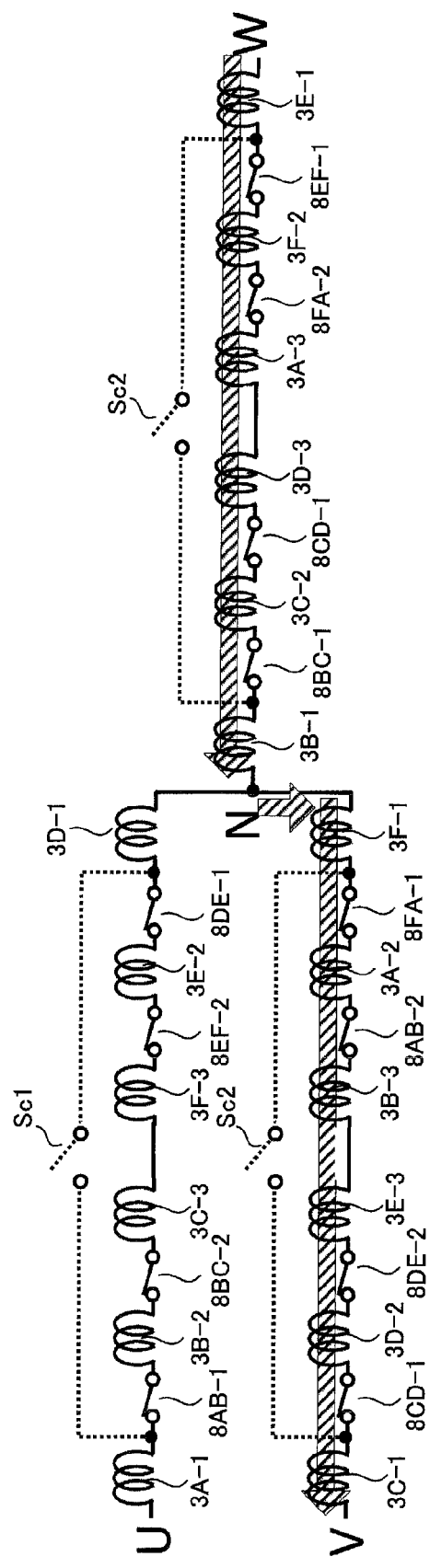
FIG. 33 is a diagram showing a state that the winding of phase U is changed from two-series of common winding to the distributed winding drive when the current of phase U is zero in the eighth embodiment of the present invention.
Figure 34:
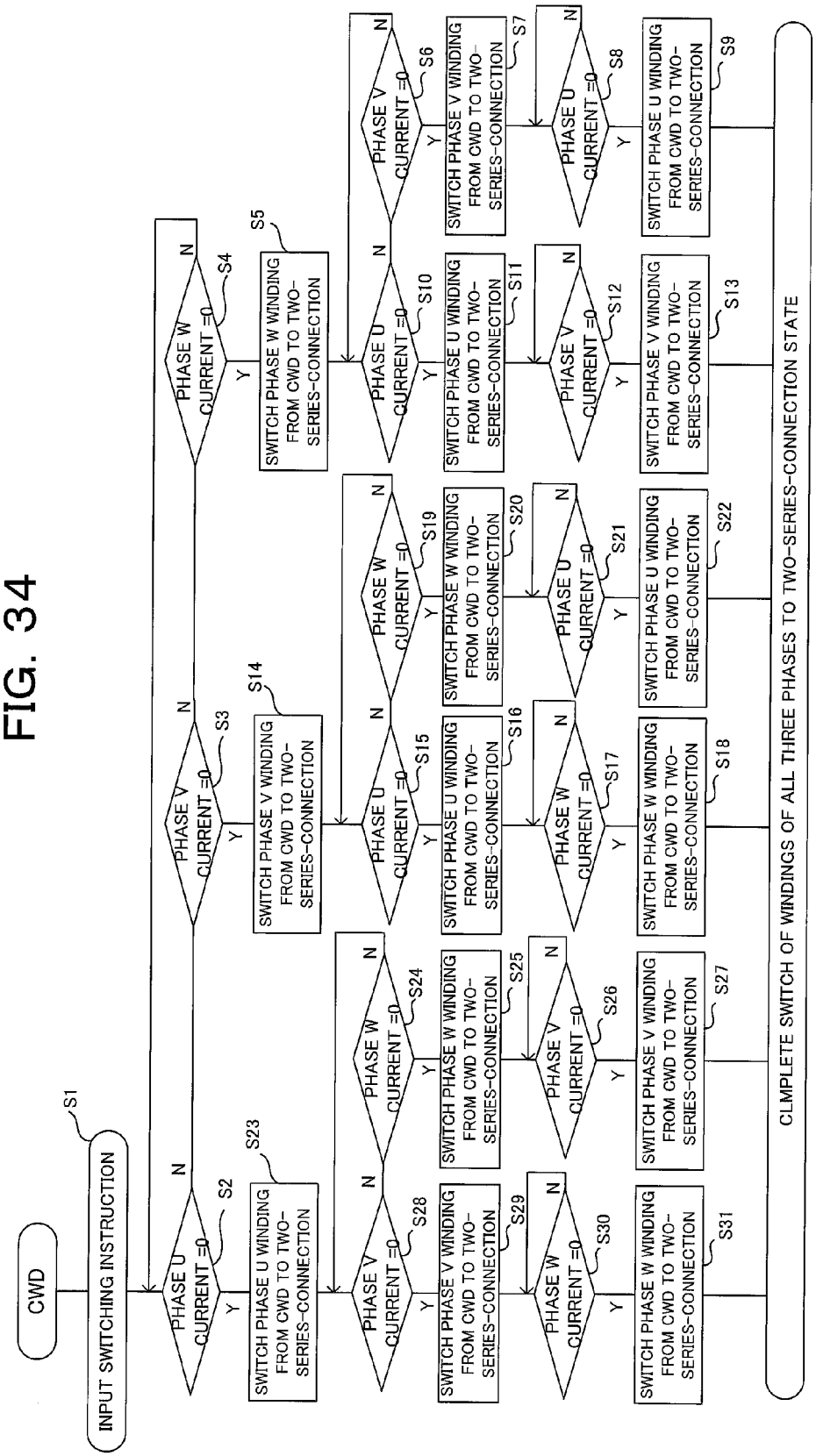
FIG. 34 is a flow chart showing processes until the winding of each phase is changed to the two-series of common winding from the concentrated winding drive in the eighth embodiment of the present invention.

Hereinafter, a method of switching a state of coils from the concentrated winding state to the distributed winding state will be described more in details, based on connection states of windings shown in FIGS. 27 to 33 and flow charts shown in FIGS. 34 and 35.

[Steps for Switching Windings of all Three Phases into Two-Series-Connection: Example 1]

Figure 27:
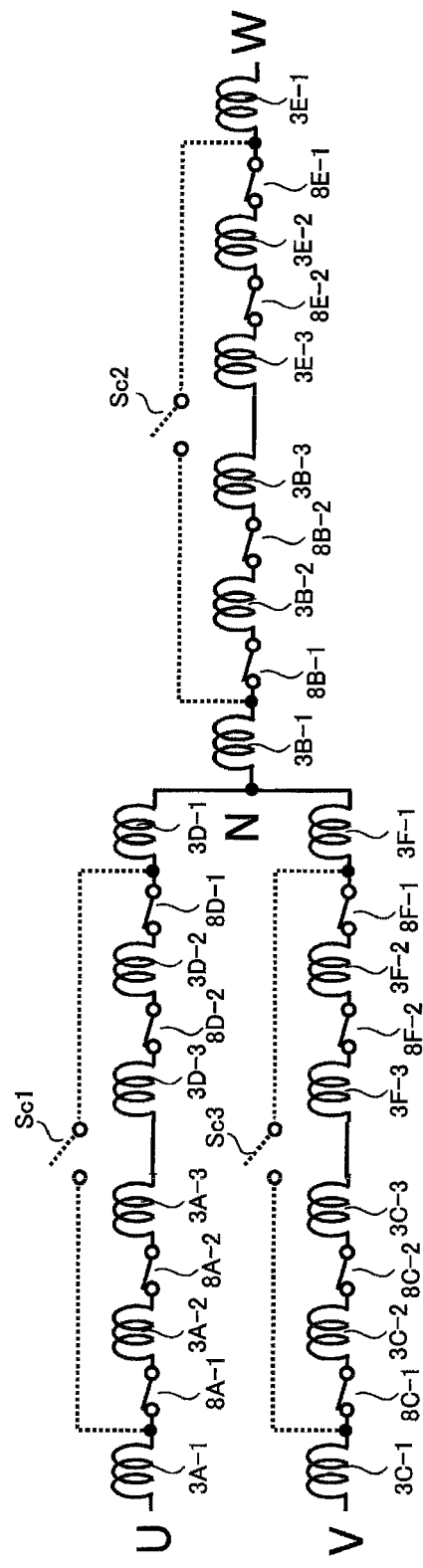
FIG. 27 is a diagram showing a connection state of coils of each phase, the coil been wound in a concentrated wining manner of each phase at the moment of driving in the eighth embodiment of the present invention.

First, there will be described a case in which, the concentrated winding drive (CWD) is performed as shown in FIG. 27, and a switching instruction is output from the motor control device 10 shown in FIG. 8 or FIG. 15. When the concentrated winding drive is performed as shown in FIG. 27, the current of each phase flows as indicated by arrows in FIG. 28.

First, when the switching instruction is inputted (step S1), it is determined whether or not the current of phase U is zero (step S2), whether or not the current of phase V is zero (step S3), and whether or not the current of phase W is zero (step S4).

For example, in a case the current of phase W is zero as seen at the timing t0 shown in FIG. 25 (step S4: YES), the switches 8B-1, 8B-2, and the switches 8E-2 and 8E-1 are made into an off-state, and the switch Sc2 is made into an on-state, so that the state of windings of phase W is switched from the concentrated winding drive to the two-series-connection of the coils 3B-1 and 3E-1 which are the common windings (step S5).

Figure 28:
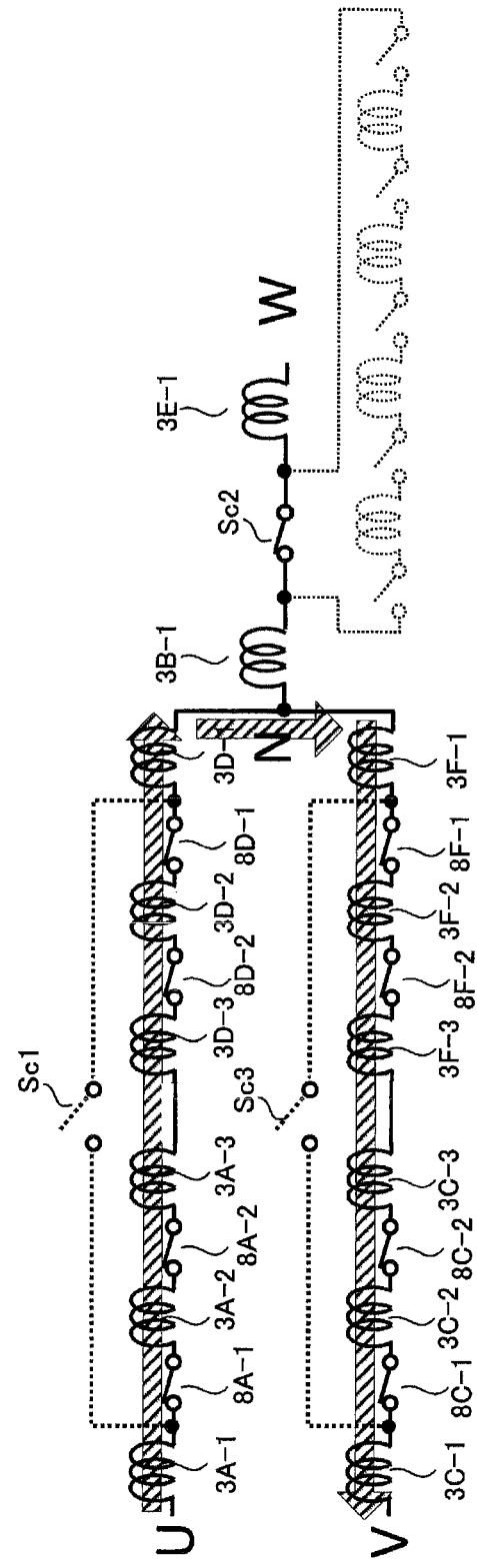
FIG. 28 is a diagram showing a state that the winding of phase W is changed from the concentrated winding drive to two-series of common winding when the current of phase W is zero in the eighth embodiment of the present invention.

FIG. 28 shows the connection state of windings of each phase in this state, and the current flows as indicated by arrows in FIG. 28.

Next, it is determined whether or not the current of phase U is zero (step S10), or whether or not the current of phase V is zero (step S6). For example, when the current of phase V has is zero as seen at the timing t1 shown in FIG. 25 (step S6: YES), the switches 8C-1, 8C-2, and the switches 8F-2, 8F-1 are made into an off-state and the switch Sc3 is made into an on-state, so that the state of windings of phase V is switched from the concentrated winding drive to the two-series-connection of the coils 3C-1 and 3F-1 which are the common windings (step S7).

Figure 29:
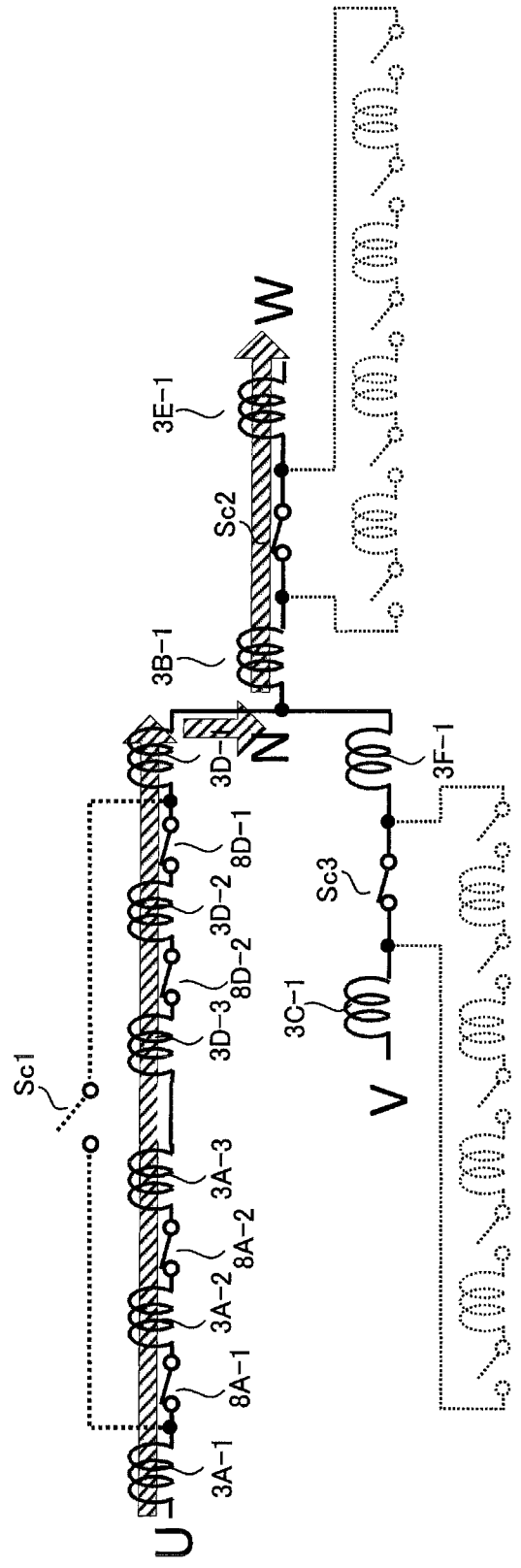
FIG. 29 is a diagram showing a state that the winding of phase V is changed from the concentrated winding drive to two-series of common winding when the current of phase V is zero in the eighth embodiment of the present invention.

The connection state of windings of each phase of this state is shown in FIG. 29, and the current flows as indicated by arrows in FIG. 29.

Next, it is determined whether or not the current of phase U is zero (step S8). For example, when the current of phase U is zero as seen at the timing t2 in FIG. 25 (step S8: YES), the switches 8A-1, 8A-2 and the switches 8D-2, 8D-1 are made into an off-state, and the switch Sc1 is made into an on-state, so that the state of windings of phase U is switched from the concentrated winding drive to the two-series-connection of the coils 3A-1 and 3D-1 which are the common windings (step S9).

Figure 30:
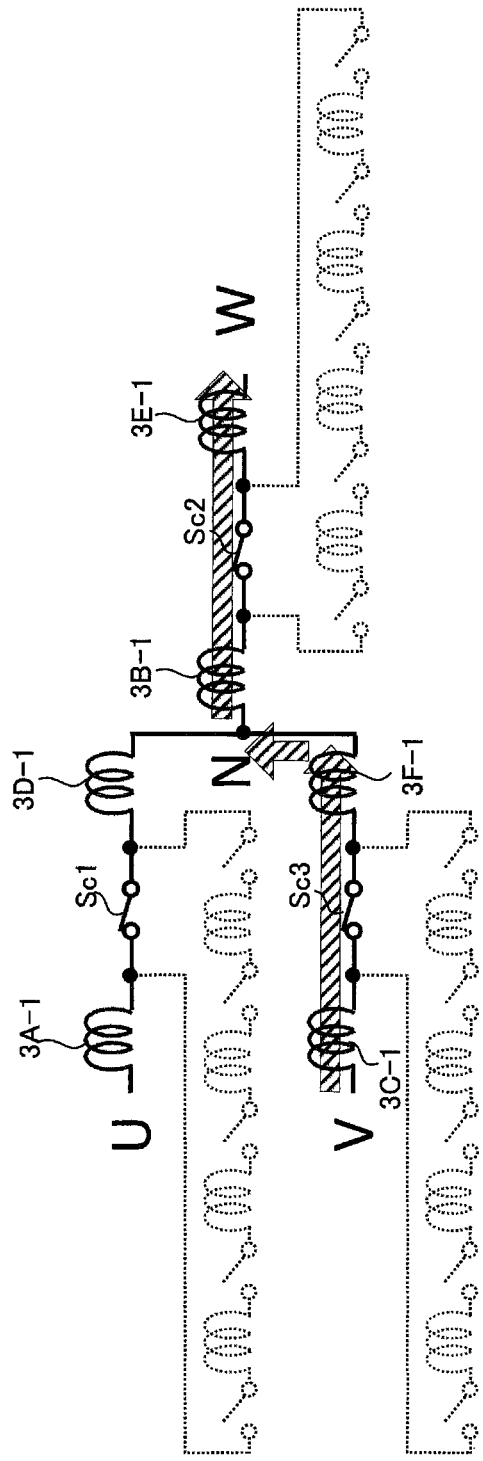
FIG. 30 is a diagram showing a state that the winding of phase U is changed from the concentrated winding drive to two-series of common winding when the current of phase U is zero in the eighth embodiment of the present invention.

In this way, at the timing when the current of each phase is zero, the state of windings of each phase is switched from the concentrated winding to the two-series-connection of common windings. FIG. 30 shows the connection state of windings in this state, and the current flows as indicated by arrows in FIG. 30.

[Steps for Switching Windings of all Three Phases into Two-Series-Connection: Example 2]

Further, when, after switching the windings of phase W from the concentrated winding drive to the two-series-connection of common windings (step S5), the current of phase U is zero (step S10: YES), the switches 8A-1, 8A-2 and the switches 8D-2, 8D-1 are made into an off-state, and the switch Sc1 is made into an on-state, so that the state of windings of phase U is switched from the concentrated winding drive to the two-series-connection of the coils 3A-1 and 3D-1 which are the common windings (step S11).

Next, it is determined whether or not the current of phase V is zero (step S12). When the current of phase V is zero (step S12: YES), the switches 8C-1, 8C-2 and the switches 8F-2, 8F-1 are made into an off-state, and the switch Sc3 is made into an on-state, so that the state of windings of phase V is switched from the concentrated winding drive to the two-series-connection of the coils 3C-1 and 3F-1 which are the common windings (step S13).

In this way, at the timing when the current of each phase has become zero, the state of windings of each phase is switched from the concentrated winding to the two-series-connection of common windings.

[Steps for Switching Windings of all Three Phases into Two-Series-Connection: Example 3]

After the switching instruction is inputted (step S1), for example, when the current of phase V is zero at the timing t1 shown in FIG. 25 (step S3: YES), the switches 8C-1, 8C-2 and the switches 8F-2, 8F-1 are made into an off-state, and the switch Sc3 is made into an on-state, so that the state of windings of phase V is switched from the concentrated winding drive to the two-series-connection of the coils 3C-1 and 3F-1 which are the common windings (step S14).

Next, it is determined whether or not the current of phase U is zero (step S15), or whether or not the current of phase W is zero (step S19). When the current of phase U is zero as seen at the timing t2 shown in FIG. 25 (step S15: YES), the switches 8A-1, 8A-2 and the switches 8D-2, 8D-1 are made into an off-state, and the switch Sc1 is made into an on-state, so that the state of windings of phase U is switched from the concentrated winding drive to the two-series-connection of the coils 3A-1 and 3D-1 which are the common windings (step S16).

Then, it is determined whether or not the current of phase W is zero (step 517). When the current of phase W is zero (step S17: YES), the switches 8B-1, 8B-2 and the switches 8E-2, 8E-1 are made into an off-state, and the switch Sc2 is made into an on-state, so that the state of windings of phase W is switched from the concentrated winding drive to the two-series-connection of the coils 3B-1 and 3E-1 which are the common windings (step S18).

In this way, at the timing when the current of each phase has become zero, the state of windings of each phase is switched from the concentrated winding to the two-series-connection of common windings.

[Steps for Switching Windings of all Three Phases into Two-Series-Connection: Example 4]

After switching the windings of phase V from the concentrated winding drive to the two-series-connection of common windings (step S14), when the current of phase W is zero (step S19: YES), the switches 8B-1, 8B-2 and the switches 8E-2, 8E-1 are made into an off-state, and the switch Sc2 is made into an on-state, so that the state of windings of phase W is switched from the concentrated winding drive to the two-series-connection of the coils 3B-1 and 3E-1 which are the common windings (step S20).

Then, it is determined whether or not the current of phase U is zero (step S21). When the current of phase U is zero (step S21: YES), the switches 8A-1, 8A-2 and the switches 8D-2, 8D-1 are made into an off-state, and the switch Sc1 is made into an on-state, so that the state of windings of phase U is switched from the concentrated winding drive to the two-series-connection of the coils 3A-1 and 3D-1 which are the common windings (step S22).

In this way, at the timing when the current of each phase has become zero, the state of windings of each phase is switched from the concentrated winding to the two-series-connection of common windings.

[Steps for Switching Windings of all Three Phases into Two-Series-Connection: Example 5]

After inputting the switching instruction (step S1), in a case, for example, that the current of phase U is zero as seen at the timing t2 shown in FIG. 25 (step S1), the switches 8A-1, 8A-2 and the switches 8D-2, 8D-1 are made into an off-state, and the switch Sc1 is made into an on-state, so that the state of windings of phase U is switched from the concentrated winding drive to the two-series-connection of the coils 3A-1 and 3D-1 which are the common windings (step S23).

Next, it is determined whether or not the current of phase W is zero (step S24), and whether or not the current of phase V is zero (step S28). When the current of phase W is zero (step S24: YES), the switches 8B-1, 8B-2 and the switches 8E-2, 8E-1 are made into an off-state, and the switch Sc2 is made into an on-state, so that the state of windings of phase W is switched from the concentrated winding drive to the two-series-connection of the coils 3B-1 and 3E-1 which are the common windings (step S25).

Then, it is determined whether or not the current of phase V is zero (step S26). When the current of phase V is zero (step S26: YES), the switches 8C-1, 8C-2 and the switches 8F-2, 8F-1 are made into an off-state, and the switch Sc3 is made into an on-state, so that the state of windings of phase V is switched from the concentrated winding drive to the two-series-connection of the coils 3C-1 and 3F-1 which are the common windings (step S27).

In this way, at the timing when the current of each phase has become zero, the state of windings of each phase is switched from the concentrated winding to the two-series-connection of common windings.

[Steps for Switching Windings of all Three Phases into Two-Series-Connection: Example 6]

After switching the windings of phase U from the concentrated winding drive to the two-series-connection derive of the common windings (step S23), when the current of phase V is zero (step S28: YES), the switches 8C-1, 8C-2 and the switches 8F-2, 8F-1 are made into an off-state, and the switch Sc3 is made into an on-state, so that the state of windings of phase V is switched from the concentrated winding drive to the two-series-connection of the coils 3C-1 and 3F-1 which are the common windings (step S29).

Then it is determined whether or not the current of phase W is zero (step S30). When the current of W phase is zero (step S30: YES), the switches 8B-1, 8B-2 and the switches 8E-2, 8E-1 are made into an off-state, and the switch Sc2 is made into an on-state, so that the state of windings of phase W is switched from the concentrated winding drive to the two-series-connection of the coils 3B-1 and 3E-1 which are the common windings (step S31).

In this way, at the timing when the current of each phase has become zero, the state of windings of each phase is switched from the concentrated winding to the two-series-connection of common windings.

[Steps for Switching Windings of all Three Phases into the Distributed Winding Drive: Example 1]

After switching the state of windings of all of three phases into the two-series-connection of common windings as mentioned above, it is determined whether or not the current of phase U is zero (step S40), whether or not the current of phase V is zero (step S41), and whether or not the current of phase W is zero (step S42).

In a case it is determined that the current of phase W becomes zero as shown by the timing t3 of FIG. 25 (step S42: YES), the switch Sc2 is made into an off-state to disconnect the two-series-connection of the coils 3B-1, 3E-1 which are common windings. Then, the switches 8BC-1, 8CD-2, and the switches 8FA-2 (not illustrated in FIG. 25), 8EF-1 are made into an on-state, so that the state of phase W is made into the distributed winding drive (step S43).

Figure 31:
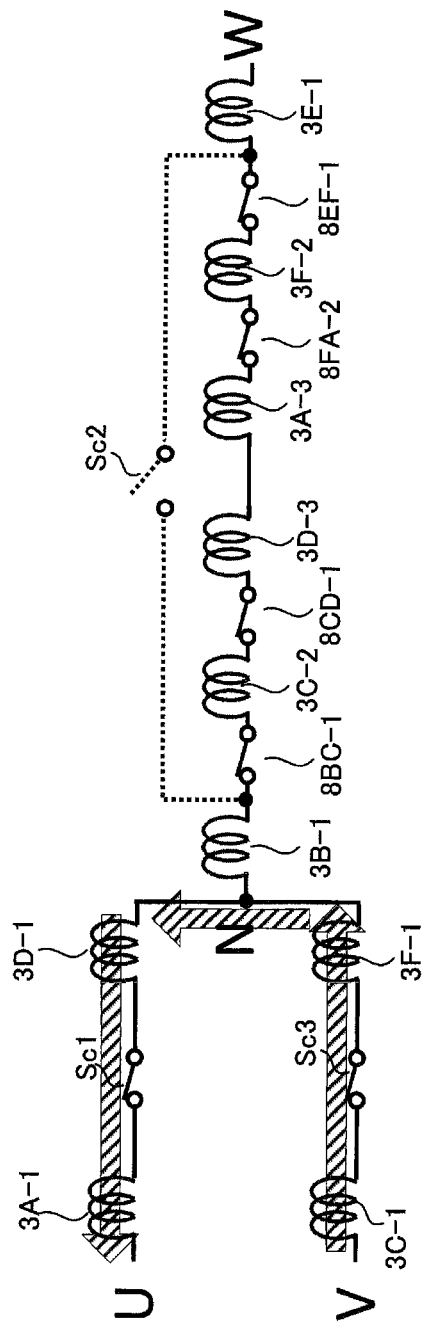
FIG. 31 is a diagram showing a state that the winding of phase W is changed from two-series of common winding to the distributed winding drive when the current of phase W is zero in the eighth embodiment of the present invention.

FIG. 31 shows the connection state of windings of each phase of this state, and the current flows as indicated by arrows shown in FIG. 31.

Next, it is determined whether or not the current of phase U is zero (step S48), and whether or not the current of phase V is zero (step S44). In a case that the current of phase V becomes zero as shown by the timing t4 of FIG. 25 (step S44: YES), the switch Sc3 is made into an off-state to disconnect the two-series-connection of the coils 3C-1, 3F-1 which are common windings. Then the switches 8CD-1, 8DE-2 and the switches 8AB-2, 8FA-1 (not illustrated in FIG. 25) are made into an on-state so that the state of phase V is made into the distributed winding drive (step S45).

Figure 32:
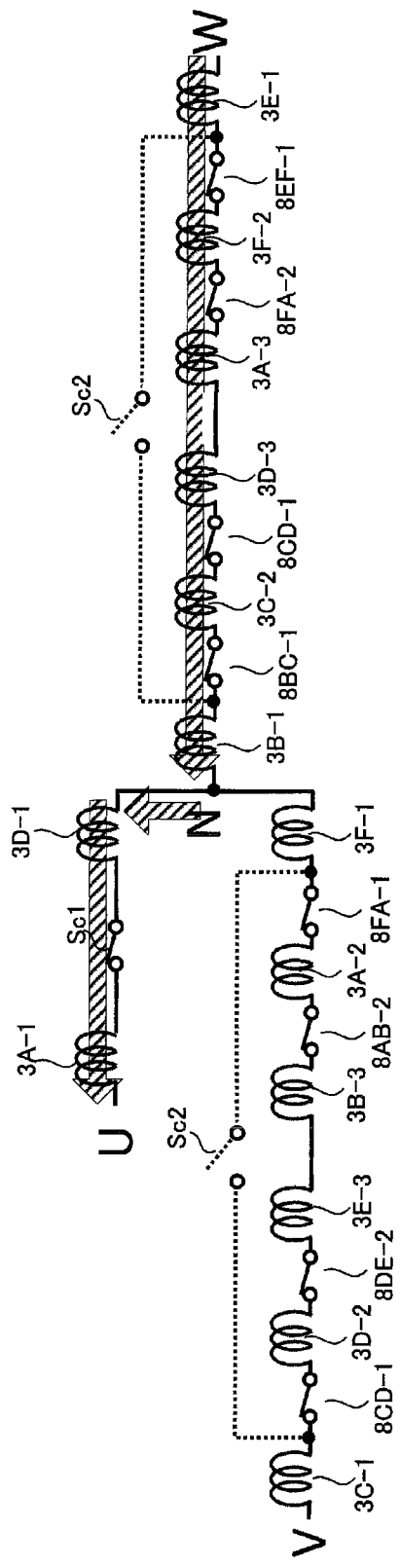
FIG. 32 is a diagram showing a state that the winding of phase V is changed from two-series of common winding to the distributed winding drive when the current of phase V is zero in the eighth embodiment of the present invention.

FIG. 32 shows the connection state of winding of each phase of this state, and the current flows as indicated by arrows in FIG. 32.

Next, it is determined whether or not the current of phase U is zero (step S46). In a case that the current of phase U becomes zero as shown by the timing t5 of FIG. 25 (step S46: YES), the switch Sc1 is made into an off-state to disconnect the two-series-connection of the coils 3A-1 and 3D-1 which are common windings. Then, the switches 8AB-1, 8BC-2 and the switches 8EF-2, 8DE-1 are made into an on-state so that the state of phase U is made into the distributed winding drive (step S47).

In this way, when the current of each phase is zero, the switching from the two-series-connection to the distributed winding is performed. FIG. 33 shows the connection state of windings of each phase of this state, and the current flows as indicated by arrows shown in FIG. 33.

As mentioned above, according to the present embodiment, as the windings of each phase is switched from the concentrated winding to the two-series-connection of common windings at the timing when the current of each phase becomes zero, in a period from a period that the current of each phase becomes zero to next period the current of each phase becomes zero, the current flows three times more than before. Flowing current is not different in total current of each phase between before and after connecting the common windings. Thereby, this embodiment does not make a trill-ripple to occur.

Further, in the present embodiment, the switching from the two-series-connection to the distributed winding is performed at the moment when the current of each phase is zero, as mentioned above. Accordingly, the voltage spike does not occur at the moment of switching. Thereby, it is possible to switch windings without loss.

[Steps for Switching Windings of all Three Phases into the Distributed Winding Drive: Example 2]

After the state of windings of phase W is switched from the two-series-connection to the distributed winding drive (step S43), in a case that the current of phase U becomes zero (step S48: YES), the switch Sc1 is made into an off-state to disconnect the two-series-connection of the coils 3A-1, 3D-1 which are the common windings. Then the switches 8AB-1, 8BC-2 and the switches 8EF-2, 8DE-1 are made into an on-state so that the state of phase U is made into the distributed winding drive (step S49).

Next, it is determined whether or not the current of phase V becomes zero (step S50). In a case that the current of phase V becomes zero (step S50: YES), the switch Sc3 is made into an off-state to disconnect the two-series-connection of the coils 3C-1, 3F-1 which are the common coils. Then the switches 8CD-1, 8DE-2 and the switches 8AB-2, 8FA-1 (not illustrated in FIG. 25) are made into an on-state so that the state of phase V is made into the distributed winding drive (step S51).

As mentioned above, when the current of each phase is zero, the switching from the two-series-connection to the distributed winding is performed.

Steps for Switching Windings of all Three Phases into the Distributed Winding Drive: Example 3]

After switching the state of windings of all phases to the two-series-connection, in a case that the current of phase V becomes zero as shown by the timing t4 of FIG. 25 (step S41 YES), the switch Sc3 is made into an off-state to disconnect the two-series-connection of the coils 3C-1, 3F-1 which are the common windings. Then, the switches 8CD-1, 8DE-2 and the switches 8AB-2, 8FA-1 (not illustrated in FIG. 25) are made into an on-state so that the state of phase V is made into the distributed winding drive (step S52).

Next, it is determined whether or not the current of phase U is zero (step S53), and whether or not the current of phase W is zero (step S57). In a case that the current of phrase U becomes zero as shown by the timing t5 of FIG. 25 (step S53: YES), the switch Sc1 is made into an off-state to disconnect the two-series-connection of the coils 3A-1, 3D-1 which are the common windings. Then, the switches 8AB-1, 8BC-2 and the switches 8EF-2, 8DE-1 (not illustrated in FIG. 25) are made into an on-state so that the state of phase U is made into the distributed winding drive (step S54).

And, it is determined whether or not the current of phase W is zero (step S55). When the current of phase W becomes zero (step S55: YES), the switch Sc2 is made into an off-state to disconnect the two-series-connection of the coils 3B-1, 3E-1 which are common windings. Then, the switches 8BC-1, 8CD-2 and the switches 8FA-2 (not illustrated in FIG. 25), 8EF-1 are made into an on-state, so that the state of phase W is made into the distributed winding drive (step S56).

As mentioned above, when the current of each phase is zero, the switching from the two-series-connection to the distributed winding is performed.

[Steps for Switching Windings of all Three Phases into the Distributed Winding Drive: Example 4]

After switching the state of windings of phase V from the two-series-connection to the distributed winding drive (step S52), in a case that the current of phase W becomes zero (step S57: YES), the switch Sc2 is made into an off-state to disconnect the two-series-connection of the coils 3B-1, 3E-1 which are common windings. Then, the switches 8BC-1, 8CD-2 and the switches 8FA-2 (not illustrated in FIG. 25), 8EF-1 are made into an on-state, so that the state of phase W is made into the distributed winding drive (step S58).

Next, it is determined whether or not the current of phase U is zero (step S59). When the current of phase U becomes zero (step 59: YES), the switch Sc1 is made into an off-state to disconnect the two-series-connection of the coils 3A-1, 3D-1 which are common windings. Then, the switches 8AB-1, 8BC-2 and the switches 8EF-2, 8DE-1 are made into an on-state, so that the state of phase U is made into the distributed winding drive (step S60).

As mentioned above, when the current of each phase is zero, the switching from the two-series-connection to the distributed winding is performed.

Steps for Switching Windings of all Three Phases into the Distributed Winding Drive: Example 5]

After switching the state of windings of all three phases is switched to the two-series-connection, in a case that the current of phase U becomes zero as shown by the timing t5 of FIG. 25 (step S40: YES), the switch Sc1 is made into an off-state to disconnect the two-series-connection of the coils 3A-1, 3D-1 which are common windings. Then, the switches 8AB-1, 8BC-2 and the switches 8EF-2, 8DE-1 are made into an on-state, so that the state of phase U is made into the distributed winding drive (step S61).

Next, it is determined whether or not the current of phase V is zero (step S66), and whether or not the current of phase W is zero (step S62). In a case that the current of phase W becomes zero (step S62: YES), the switch Sc2 is made into an off-state to disconnect the two-series-connection of the coils 3B-1, 3E-1 which are common windings. Then, the switches 8BC-1, 8CD-2 and the switches 8FA-2 (not illustrated in FIG. 25), 8EF-1 are made into an on-state, so that the state of phase W is made into the distributed winding drive (step S63).

Next, it is determined whether or not the current of phase V becomes zero (step S64). When the current of phase V becomes zero (step S64: YES), the switch Sc3 is made into an off-state to disconnect the two-series-connection of the coils 3C-1, 3F-1 which are common windings. Then, the switches 8CD-1, 8DE-2 and the switches 8AB-2, 8FA-1 (not illustrated in FIG. 25) are made into an on-state, so that the state of phase V is made into the distributed winding drive (step S65).

As mentioned above, when the current of each phase is zero, the switching from the two-series-connection to the distributed winding is performed.

Steps for Switching Windings of all Three Phases into the Distributed Winding Drive: Example 6]

After switching the state of windings of phase U is switched from the two-series-connection to the distributed winding derive (step S61), when the current of phase V becomes zero (step S66: YES), the switch Sc3 is made into an off-state to disconnect the two-series-connection of the coils 3C-1, 3F-1 which are common windings. Then, the switches 8CD-1, 8DE-2 and the switches 8AB-2, 8FA-1 (not illustrated in FIG. 25) are made into an on-state, so that the state of phase V is made into the distributed winding drive (step S67).

And, it is determined whether or not the current of phase W is zero (step S68). When the current of phase W becomes zero (step S68: YES), the switch Sc2 is made into an off-state to disconnect the two-series-connection of the coils 3B-1, 3E-1 which are common windings. Then, the switches 8BC-1, 8CD-2 and the switches 8FA-2 (not illustrated in FIG. 25), 8EF-1 are made into an on-state, so that the state of phase W is made into the distributed winding drive (step S69).

As mentioned above, when the current of each phase is zero, the switching from the two-series-connection to the distributed winding is performed.

As mentioned above, according to the present embodiment, as the state of windings of each phase is switched from the concentrated winding to the two-series-connection of common windings, three times more current flows than before in the common windings in a period from a period the current of each phase becomes zero to a next period when the current of each phase becomes zero. Flowing current is not different in total current of each phase between before and after connecting the common windings. Thereby, this embodiment does not make a trill-ripple to occur.

In the present embodiment, as mentioned above, as the switching from the two-series-connection to the distributed winding is performed when the current of each phase is zero, voltage spike does not occur at the moment of switching. So, it is possible to switch the windings without loss.

In the present embodiment, described is an example that the state of windings of each phase is switched from the concentrated winding drive to the distributed winding derive at the moment of 120-degree current supply drive. However, the present invention can be applied to other-angular-degree current supply system other than the 120 degree current supply system.

In addition, as the switch which performs the connection and disconnection of coils, it is possible to employ the bi-directional switch described in the seventh embodiment.

Further, in the present embodiment, described is an example that the state of windings of each phase is switched from the concentrated winding drive to the distributed winding drive. However, in a case that the state of windings of each phase is switched from the distributed winding drive to the concentrated winding drive, the following processes may be executed: when it is detected that the current value of each phase becomes zero, by processes opposite to the processes mentioned above, the state is switched from the distributed winding drive to the two-series-connection; and further, when it is detected that the current value of each phase becomes zero, the state may be switched from the two-series-connection to the concentrated winding drive.

Industrial Applicability

The connection state of windings wound around the stator teeth is changed freely between the concentrated winding and the distributed winding depending on the rotating speed, and thereby, without increasing devices in size, a single motor can perform plural drive characteristics, and the present invention can be applied for the purpose of expanding the output range.

Explanation Of Reference Numbers

1 Motor (rotating electric machine)
2 Stator yoke
3, 3a, 3b Coil (winding)
3A-1, 3A-2, 3A-3, 3B-1, 3B-2, 3B-3, 3C-1, 3C-2, 3C-3, 3D-1, 3D-2, 3D-3, 3E-1, 3E-2,
3E-3, 3F-1, 3F-2, 3F-3 Coil (winding)
4 Stator
5, 6 Permanent magnet
7 Rotor
8 Switch
8A-1, 8A-2, 8B-1, 8B-2, 8C-1, 8C-2, 8D-1, 8D-2, 8E-1, 8E-2, 8F-1, 8F-2, 8AB-1, 8AB-2,
8BC-1, 8BC-2, 8CD-1, 8CD-2, 8DE-1, 8DE-2, 8EF-1, 8EF-2, 8FA-1, 8FA-2 Switch
8', 8" Bi-directional switch
9 Switch control device
10 Motor control device
20, 20', 21, 21' MOSFET
20a, 21a Parasitic diode
A to F Stator teeth
Rb Current breaking resistance
Rg Gate resistance

The invention claimed is:

1. Stator teeth placed on a stator yoke of an electric motor, each stator tooth of the stator teeth comprising:
a plurality of winding units being wound around the stator tooth; and
a plurality of switches, one of said switches in a first state being connected with an end portion of one of the winding units and with an end portion of the other one of the winding units on a tooth to create a concentrated winding state, and
wherein the one switch is capable in a second state of connecting with an end portion of another winding unit wound around another stator tooth to create a distributed winding state.

2. The Stator teeth, according to claim 1, wherein the end portion of the one of the two winding units is further provided with a switch capable of connecting with the end portion of the another winding unit of the another stator tooth.

3. A stator of an electric motor comprising:
a stator yoke; and
stator teeth formed unifiedly with the stator yoke, or placed on the stator yoke, wherein
a plurality of winding units wound around each stator tooth of the stator teeth, and
a plurality of switches, one of said switches in a first state is connected with an end portion of one of the winding units and an end portion of the other one of the winding units on a tooth to create a concentrated winding state, and
wherein the one switch is capable in a second state of also connecting with an end portion of another winding unit wound around another stator tooth to create a distributed winding state.

4. The stator according to claim 3, wherein the end portion of the one winding unit is further provided with a switch capable of connecting with the end portion of the another winding unit wound around the another stator tooth.

5. A rotating electric machine comprising:
a rotor having a permanent magnet;
stator teeth formed unifiedly with a stator yoke, or placed on the stator yoke, at least three of the stator teeth being provided for one pole of the permanent magnet;
a plurality of winding units wound around each stator tooth of the stator teeth; and
a plurality of switches, one of said switches in a first state being provided to each stator tooth to be connected with an end portion of one of the winding units and an end portion of the other one of the winding units on a tooth to create a concentrated winding state, and
wherein the one switch is further capable in a second state of being connected with an end portion of another winding unit wound around another stator tooth to create a distributed winding state.

6. The rotating electric machine according to claim 5 wherein the end portion of the one winding unit is further provided with a switch capable of connecting with the end portion of the another winding unit wound around the another stator tooth.

7. The rotating electric machine according to claim 6, wherein the switch is connected with the end portion of each of the at least two winding units so as to be connected selectively with each other in parallel or in series.

8. The rotating electric machine according to claim 5, wherein the switch is connected with the end portion of each of the winding units so as to be connected selectively with each other in parallel or in series.

9. A rotating electric machine according to claim 5, wherein
at least six stator teeth are provided on one pole of the permanent magnetic,
at least three winding units are wound around each stator tooth,
the plurality of switches includes a switch for connecting the at least three winding units in series to form a concentrated winding state or disconnecting the at least three winding units from each other, and a switch for connecting or disconnecting from each other, one winding unit wound around one stator tooth and one winding unit wound around the other stator tooth so as to form or not form a distributed winding state, wherein
a winding unit located at an end portion on an opposite side of a winding unit located at an end portion connecting with a current supplying terminal, within the winding units wound around each stator tooth, said winding unit being connected with a winding unit located at an end portion on an opposite side of a winding unit located at an end portion connecting with a current supplying terminal in a paired stator tooth, and the plurality of switches further includes a switch connecting the winding units with each other or disconnecting them from each other, a winding unit of the end portion for connecting with the current supplying terminal of the stator tooth, and a winding unit of the end portion for connecting with the current supplying terminal of a paired stator tooth.

10. A method for controlling a rotating electric machine comprising:
  a rotor having permanent magnet;
  stator teeth formed unifiedly with a stator yoke, or placed on the stator yoke, at least three of the stator teeth being provided for one pole of the permanent magnet;
  a plurality of winding units wound around each stator tooth of the stator teeth; and
  a plurality of switches, one of said switches in a first state being provided to each stator tooth to be connected with an end portion of one of the winding units and an end portion of the other one of the winding units on a tooth to create a concentrated winding state, the one switch being further capable in a second state of being connected with an end portion of another winding wound around another stator tooth to create a distributed winding state, the method including the steps of:
  changing the one switch, when a rotating speed necessary for the rotating electric machine is lower than a predetermined criterion speed, so that the end portion of the one of winding units and the end portion of the other one of the winding units are connected with each other, and
  changing the one switch, when the rotating speed necessary for the rotating electric machine is higher than a predetermined criterion speed, so that the end portion of the one of winding units and the end portion of the another winding unit wound around the another stator tooth are connected with each other.

11. The method for controlling the rotating electric machine according to claim 10, wherein
  the switch is connected with the end portion of each winding unit so that winding units are connected selectively in parallel or in series, and
  when the rotating speed necessary for the rotating electric machine is lower than a predetermined criterion speed, the switch is changed so that the winding units are connected in series with each other.

12. A method for controlling a rotating electric machine comprising:
  a rotor having a permanent magnet;
  stator teeth formed unifiedly with a stator yoke, or placed on the stator yoke, at least three of the stator teeth being provided for one pole of the permanent magnet;
  a plurality of winding units wound around each stator tooth of the stator teeth; and
  plurality of switches, one of said switches in a first state being provided on each stator tooth to be connected with an end portion of one of the winding units and an end portion of the other one of the winding units on a tooth to create a concentrated winding state, the one switch being further capable in a second state of being connected with an end portion of another winding wound around another stator tooth to create a distributed winding state, the method including the steps of:
  changing the one switch, when torque necessary for the rotating electric machine is higher than a predetermined criterion torque, so that the end portion of the one of the winding units and the end portion of the other one of the winding units are connected with each other, and
  changing the one switch, when torque necessary for the rotating electric machine is lower than a predetermined criterion torque, so that the end portion of the one of the winding units and the end portion of the another winding unit wound around the another stator tooth are connected with each other.

13. The method for controlling the rotating electric machine according to claim 12, wherein
  the switch is connected with the end portion of each winding unit so that the winding units are connected selectively in parallel or in series, and
  when the torque necessary for the rotating electric machine is higher than the predetermined criterion torque, the switch is changed so that the units are connected in series with each other.

14. A method for controlling a rotating electric machine having:
  a rotor having a permanent magnet;
  stator teeth formed unifiedly with a stator yoke, or placed on the stator yoke, at least three of the stator teeth being provided for one pole of the permanent magnet;
  a plurality of winding units wound around each stator tooth of the stator teeth; and
  one switch being provided to each stator tooth to be connected with an end portion of one of the winding units and an end portion of the other one of the winding units, the one switch being further capable of being connected with an end portion of another winding wound around another stator tooth, the method including the steps of:
  changing voltage to be applied to the winding units from direct voltage to alternating voltage, in such a way that, in a case that a connection between windings to which plus voltage is applied is switched intermittently at a predetermined proportion for each phase, a connection between winding units to which minus voltage is applied is always held, and in a case where the connection between winding units to which minus voltage is applied to is switched intermittently at a predetermined proportion for each phase, the connection between winding units to which plus voltage is applied to is always held.

15. A method for controlling a rotating electric machine having:
  a rotor having a permanent magnet;
  stator teeth formed unifiedly with a stator yoke, or placed on the stator yoke, at least three of the stator teeth being provided for one pole of the permanent magnet;
  a plurality of winding units wound around each stator tooth of the stator teeth; and
  a plurality of switches being provided to each stator tooth to be connected with an end portion of one of the winding units and an end portion of the other one of the two winding units, the one switch being further capable of being connected with an end portion of another winding unit wound around another stator,
  the method including the steps of:
  making induced voltage into a sine wave; and
  switching the one switch so as to switch between a concentrated winding state that the end portion of the one of the winding units and the end portion of the other one of the winding units and a distributed winding state that the end portion of one of the winding units and the end portion of the another winding unit wound around the another stator tooth, a connection state of winding units of each phase minutely according to a voltage aim value.

16. A method for controlling a rotating electric machine having:
- a rotor having a permanent magnet;
- stator teeth formed unifiedly with a stator yoke, or placed on the stator yoke, at least three of the stator teeth being provided for one pole of the permanent magnet;
- a plurality of winding units wound around each stator tooth of the stator teeth; and
- a plurality of switches being provided to each stator tooth to be connected with an end portion of one of the winding units and an end portion of the other one of the winding units, the one switch being further connected with an end portion of another winding unit wound around another stator tooth, wherein
- when the one switch is changed so that the end portion of one of the winding units and the end portion of the another winding unit wound around the another stator tooth, the switch is changed so that, with respect to each stator tooth, the winding unit is connected with a winding unit different positionally so as to change from a concentrated winding state to a distributed winding state, and so that the numbers of winding units included in each phase are equal to each other.

17. A method for controlling a rotating electric machine to which three-phrase alternating current is applied, the rotating electric machine comprising:
- a rotor having a permanent magnet;
- stator teeth formed unifiedly with a stator yoke, or placed on the stator yoke, at least six of the stator teeth being provided for one pole of the permanent magnet;
- at least three winding units wound around each stator tooth of the stator teeth;
- a first switch for connecting the at least three winding units in series or disconnecting the at least three winding units from each other; and
- a second switch for connecting or disconnecting from each other, one winding unit wound around one stator tooth and one winding unit wound around the other stator tooth; wherein
- a winding unit located at an end portion on opposite side of a winding unit located at an end portion connecting with a current supplying terminal, within the winding units wound around each stator tooth, said winding unit being connected with a winding unit located at an end portion on opposite side of a winding unit located at an end portion connecting with a current supplying terminal in a paired stator tooth, and
- a third switch connecting with each other or disconnecting from each other, a winding unit located at an end portion connecting with the current supplying terminal of each stator tooth and a winding unit located at an end portion connecting with the current supplying terminal of a paired stator tooth, the method having:
- a first connection state that when a rotating speed necessary for the rotating electric machine is lower than a predetermined criterion speed, the first switch is switched so as to connect in series the at least three winding units wound with each other; and
- a second connection state that when a rotating speed necessary for the rotating electric machine is higher than a predetermined criterion speed, the first switch is disconnected and the second switch is switched so as to connect a winding unit of one stator tooth and the other stator tooth with each other, and including the steps to be executed in order to change over from the first connection state to the second connection state:
- at a moment when it is detected an alternating current value of any one of phases has become zero,
- connecting with each other by the third switch, a winding unit located at the end portion connecting with the current supplying terminal of a stator tooth to which the alternating current of the phase is applied and a winding unit located at the end portion connecting with the current supplying terminal of the paired stator tooth; and
- disconnecting from each other by the first switch, the at least three winding units wound around the stator tooth to which the alternating current of the phase is applied; and
- at a moment when it is detected an alternating current value of any one of phases has become zero secondly:
- connecting with each other by the second switch, one winding unit wound around one stator tooth of the phase and one winding unit wound around the other stator tooth of the phase; and
- with respect to the other stator teeth, further connecting with each other by the second switch, one winding unit wound around each stator tooth and one winding unit wound around the other stator tooth; and
- disconnecting from each other by the third switch, the winding unit located at the end portion connecting with the current supplying terminal of the stator tooth to which the alternating current of the phase is supplied and the winding unit located at the end portion connecting with the current supplying terminal of the paired stator tooth, and
- the method including in order to change over from the second connection state to the first connection state, the steps of connecting with each other and disconnecting from each other the winding units, the steps being executed in accordance with processes opposite to the mentioned processes at a moment when it is detected that the alternating current value of any one of phase has become zero.

18. A method for controlling a rotating electric machine to which three-phrase alternating current is applied, the rotating electric machine comprising:
- a rotor having a permanent magnet;
- stator teeth formed unifiedly with a stator yoke, or placed on the stator yoke, at least six of the stator teeth being provided for one pole of the permanent magnet;
- at least three winding units wound around each stator tooth of the stator teeth;
- a first switch for connecting the at least three winding units in series or disconnecting the at least three winding units from each other; and
- a second switch for connecting or disconnecting from each other, one winding unit wound around one stator tooth and one winding unit wound around the other stator tooth; wherein
- a winding unit located at an end portion on opposite side of a winding unit located at an end portion connecting with a current supplying terminal, within the winding units wound around each stator tooth, said winding unit being connected with a winding unit located at an end portion on opposite side of a winding unit located at an end portion connecting with a current supplying terminal in a paired stator tooth, and
- a third connecting with each other or disconnecting from each other, a winding unit located at an end portion connecting with the current supplying terminal of each stator tooth and a winding unit located at an end portion connecting with the current supplying terminal of a paired stator tooth, the method having:

a first connection state that when a rotating speed necessary for the rotating electric machine is higher than a predetermined criterion torque, the first switch is switched so as to connect in series the at least three winding units wound with each other; and a second connection state that when a rotating speed necessary for the rotating electric machine is lower than a predetermined criterion torque, the first switch is disconnected and the second switch is switched so as to connect a winding unit of one stator tooth and the other stator tooth with each other, and including the steps to be executed in order to change over from the first connection state to the second connection state:

at a moment when it is detected an alternating current value of any one of phases has become zero, connecting with each other by the third switch, a winding unit located at the end portion connecting with the current supplying terminal of a stator tooth to which the alternating current of the phase is applied and a winding unit located at the end portion connecting with the current supplying terminal of the paired stator tooth; and disconnecting from each other by the first switch, the at least three winding units wound around the stator tooth to which the alternating current of the phase is applied; and at a moment when it is detected an alternating current value of any one of phases has become zero secondly:

connecting with each other by the second switch, one winding unit wound around one stator tooth of the phase and one winding unit wound around the other stator tooth of the phase; and with respect to the other stator teeth, further connecting with each other by the second switch, one winding unit wound around each stator tooth and one winding unit wound around the other stator tooth; and disconnecting from each other by the third switch, the winding unit located at the end portion connecting with the current supplying terminal of the stator tooth to which the alternating current of the phase is supplied and the winding unit located at the end portion connecting with the current supplying terminal of the paired stator tooth, and the method including in order to change over from the second connection state to the first connection state, the steps of connecting with each other and disconnecting from each other the winding units, the steps being executed in accordance with processes opposite to the mentioned processes at a moment when it is detected that the alternating current value of any one of phase has become zero.

* * * * *